US012657027B2

(12) United States Patent
Kilada et al.

(10) Patent No.: US 12,657,027 B2
(45) Date of Patent: Jun. 16, 2026

(54) STALLING AN INSTRUCTION FETCH OPERATION IMPACTED BY A HAZARD WITHOUT STALLING ANOTHER INSTRUCTION FETCH OPERATION NOT IMPACTED BY THE HAZARD

(71) Applicant: Intel Corporation, Santa Clara, CA (US)

(72) Inventors: Eliyah Kilada, Portland, OR (US); Ammon Christiansen, Hillsboro, OR (US); Ariel Fabien Sabba, Lavon (IL); Christopher Celio, Santa Clara, CA (US); Ankur Groen, San Jose, CA (US); Muhammad Faisal Azeem, Hillsboro, OR (US); Malihe Ahmadi, Sudbury, MA (US); Rangeen Basu Roy Chowdhury, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/712,101

(22) Filed: Apr. 2, 2022

(65) Prior Publication Data

US 2023/0315466 A1      Oct. 5, 2023

(51) Int. Cl.
*G06F 9/30*        (2018.01)
*G06F 9/38*        (2018.01)

(52) U.S. Cl.
CPC ........ *G06F 9/3802* (2013.01); *G06F 9/30047* (2013.01); *G06F 9/3838* (2013.01); *G06F 9/3861* (2013.01); *G06F 9/3867* (2013.01)

(58) Field of Classification Search
CPC .. G06F 9/3802; G06F 9/30047; G06F 9/3838; G06F 9/3861; G06F 9/3867
See application file for complete search history.

(56) References Cited

U.S. PATENT DOCUMENTS

| | | | |
|---|---|---|---|
| 5,434,987 A | 7/1995 | Abramson et al. | |
| 6,035,393 A | 3/2000 | Glew et al. | |
| 6,079,014 A | 6/2000 | Papworth et al. | |
| 6,275,924 B1 * | 8/2001 | Subash ................. | G06F 9/3867 |
| | | | 712/E9.055 |

(Continued)

OTHER PUBLICATIONS

Non-Final Office Action, U.S. Appl. No. 17/712,103, May 2, 2025, 16 pages.

*Primary Examiner* — Corey S Faherty
(74) *Attorney, Agent, or Firm* — Nicholson De Vos Webster & Elliott LLP

(57) ABSTRACT

At least one instruction storage coupled with a fetch unit including sets of fetch circuitry each having a same plurality of pipeline stages. The sets of fetch circuitry perform fetch operations to fetch blocks of instructions from the at least one instruction storage. Stall circuitry, in response to an indication of a hazard for a given pipeline stage of a first set of fetch circuitry, retains a fetch operation for a first block of instructions at the given pipeline stage, and zero or more fetch operations for zero or more corresponding blocks of instructions at zero or more preceding pipeline stages of the first set of fetch circuitry, until the hazard has been removed. The stall circuitry advances a fetch operation for a second block of instructions from the given pipeline stage of a second set of fetch circuitry, during an initial cycle of the one or more cycles.

13 Claims, 17 Drawing Sheets

METHOD
330

STORE INSTRUCTIONS IN AT LEAST ONE INSTRUCTION STORAGE — 331

CONCURRENTLY INITIATE FETCH OPERATION FOR FIRST BLOCK OF INSTRUCTIONS FROM AT LEAST ONE INSTRUCTION STORAGE WITH FIRST SET OF FETCH CIRCUITRY, AND INITIATE FETCH OPERATION FOR SECOND BLOCK OF INSTRUCTIONS FROM AT LEAST ONE INSTRUCTION STORAGE WITH SECOND SET OF FETCH CIRCUITRY, SETS OF FETCH CIRCUITRY EACH HAVING SAME PLURALITY OF PIPELINE STAGES — 332

RECEIVE INDICATION OF HAZARD FOR GIVEN PIPELINE STAGE OF FIRST SET OF FETCH CIRCUITRY — 333

RETAIN FETCH OPERATION FOR FIRST BLOCK OF INSTRUCTIONS AT GIVEN PIPELINE STAGE OF FIRST SET OF FETCH CIRCUITRY, AND RETAIN ANY FETCH OPERATIONS FOR ANY CORRESPONDING BLOCKS OF INSTRUCTIONS AT ANY PRECEDING PIPELINE STAGES OF FIRST SET OF FETCH CIRCUITRY, FOR ONE OR MORE CYCLES, UNTIL HAZARD HAS BEEN REMOVED — 334

ADVANCE FETCH OPERATION FOR SECOND BLOCK OF INSTRUCTIONS FROM GIVEN PIPELINE STAGE OF SECOND SET OF FETCH CIRCUITRY, DURING INITIAL CYCLE OF ONE OR MORE CYCLES — 335

OPTIONALLY ADVANCE FETCH OPERATION FOR THIRD BLOCK OF INSTRUCTIONS FROM IMMEDIATELY PRECEDING PIPELINE STAGE OF SECOND SET OF FETCH CIRCUITRY INTO GIVEN PIPELINE STAGE OF SECOND SET OF FETCH CIRCUITRY, DURING INITIAL CYCLE OF ONE OR MORE CYCLES — 336

(56) References Cited

U.S. PATENT DOCUMENTS

| | | | |
|---|---|---|---|
| 6,385,715 B1 | 5/2002 | Merchant et al. | |
| 6,604,190 B1 | 8/2003 | Tran | |
| 6,751,724 B1 * | 6/2004 | Moyer | G06F 9/3814 |
| | | | 712/210 |
| 6,981,129 B1 | 12/2005 | Boggs et al. | |
| 7,444,498 B2 | 10/2008 | Eickemeyer et al. | |
| 7,836,281 B1 | 11/2010 | Tremblay et al. | |
| 8,171,266 B2 | 5/2012 | Karp et al. | |
| 9,146,745 B2 | 9/2015 | Jourdan et al. | |
| 9,519,944 B2 * | 12/2016 | Goodman | G06F 9/30 |
| 10,754,655 B2 | 8/2020 | Chauhan et al. | |
| 2003/0126406 A1 | 7/2003 | Hammarlund et al. | |
| 2004/0226011 A1 | 11/2004 | Augsburg et al. | |
| 2006/0010309 A1 | 1/2006 | Chaudhry et al. | |
| 2008/0005534 A1 | 1/2008 | Jourdan et al. | |
| 2008/0229068 A1 * | 9/2008 | Bose | G06F 9/3851 |
| | | | 712/E9.055 |
| 2015/0046655 A1 | 2/2015 | Nystad et al. | |
| 2015/0100763 A1 | 4/2015 | Holm | |
| 2015/0205725 A1 | 7/2015 | Al-Otoom et al. | |
| 2016/0357561 A1 | 12/2016 | Greenhalgh et al. | |
| 2018/0165097 A1 * | 6/2018 | Hanley | G06F 12/14 |
| 2020/0004538 A1 | 1/2020 | Fleming et al. | |
| 2021/0326141 A1 | 10/2021 | Tran | |
| 2021/0374063 A1 | 12/2021 | Jeong et al. | |
| 2022/0100519 A1 | 3/2022 | Cohen et al. | |
| 2022/0121449 A1 | 4/2022 | Grassi | |
| 2022/0164254 A1 | 5/2022 | Smittle et al. | |
| 2023/0315467 A1 * | 10/2023 | Kilada | G06F 9/30043 |

* cited by examiner

METHOD
330

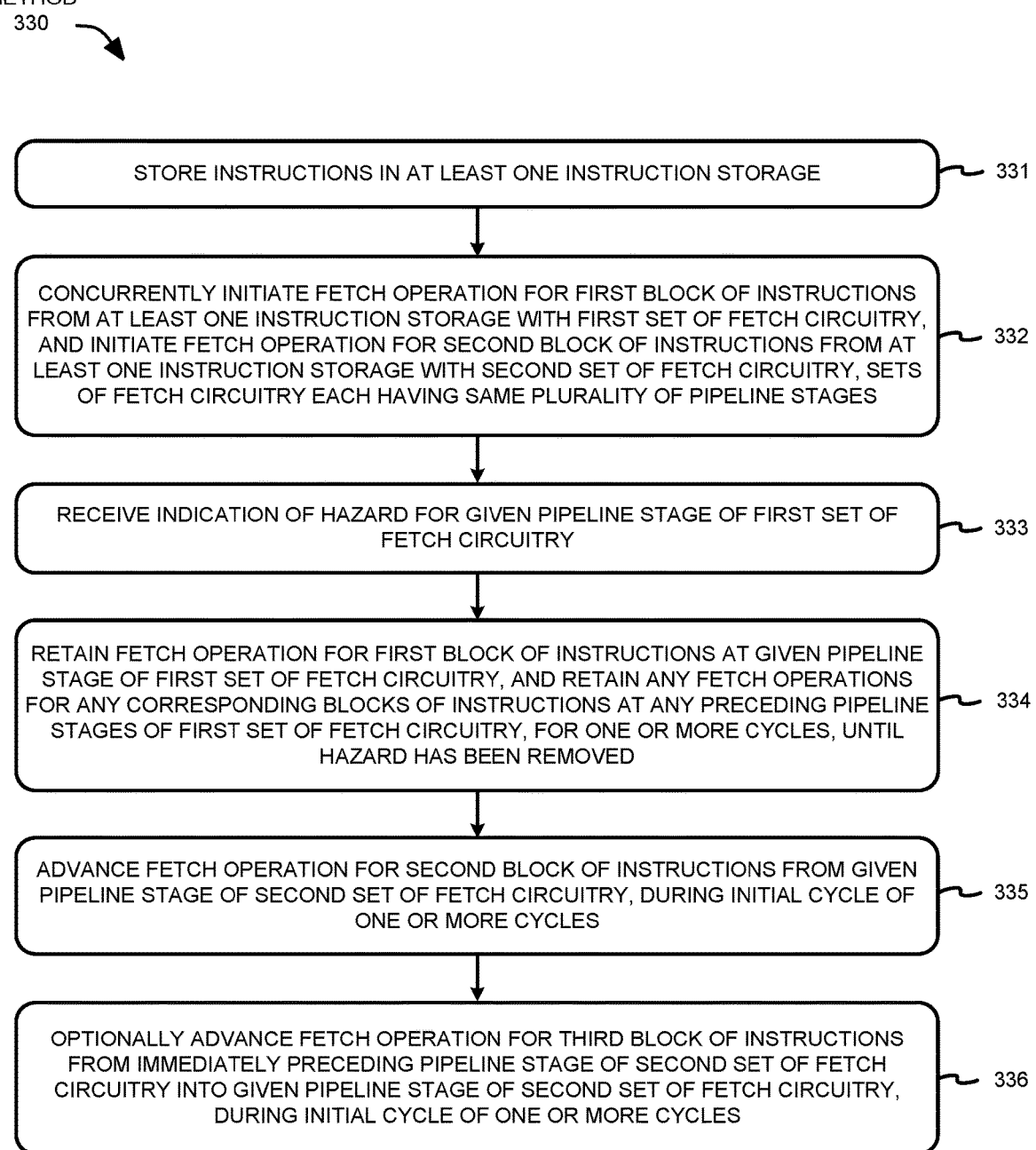

STORE INSTRUCTIONS IN AT LEAST ONE INSTRUCTION STORAGE          — 331

CONCURRENTLY INITIATE FETCH OPERATION FOR FIRST BLOCK OF INSTRUCTIONS FROM AT LEAST ONE INSTRUCTION STORAGE WITH FIRST SET OF FETCH CIRCUITRY, AND INITIATE FETCH OPERATION FOR SECOND BLOCK OF INSTRUCTIONS FROM AT LEAST ONE INSTRUCTION STORAGE WITH SECOND SET OF FETCH CIRCUITRY, SETS OF FETCH CIRCUITRY EACH HAVING SAME PLURALITY OF PIPELINE STAGES          — 332

RECEIVE INDICATION OF HAZARD FOR GIVEN PIPELINE STAGE OF FIRST SET OF FETCH CIRCUITRY          — 333

RETAIN FETCH OPERATION FOR FIRST BLOCK OF INSTRUCTIONS AT GIVEN PIPELINE STAGE OF FIRST SET OF FETCH CIRCUITRY, AND RETAIN ANY FETCH OPERATIONS FOR ANY CORRESPONDING BLOCKS OF INSTRUCTIONS AT ANY PRECEDING PIPELINE STAGES OF FIRST SET OF FETCH CIRCUITRY, FOR ONE OR MORE CYCLES, UNTIL HAZARD HAS BEEN REMOVED          — 334

ADVANCE FETCH OPERATION FOR SECOND BLOCK OF INSTRUCTIONS FROM GIVEN PIPELINE STAGE OF SECOND SET OF FETCH CIRCUITRY, DURING INITIAL CYCLE OF ONE OR MORE CYCLES          — 335

OPTIONALLY ADVANCE FETCH OPERATION FOR THIRD BLOCK OF INSTRUCTIONS FROM IMMEDIATELY PRECEDING PIPELINE STAGE OF SECOND SET OF FETCH CIRCUITRY INTO GIVEN PIPELINE STAGE OF SECOND SET OF FETCH CIRCUITRY, DURING INITIAL CYCLE OF ONE OR MORE CYCLES          — 336

METHOD
770

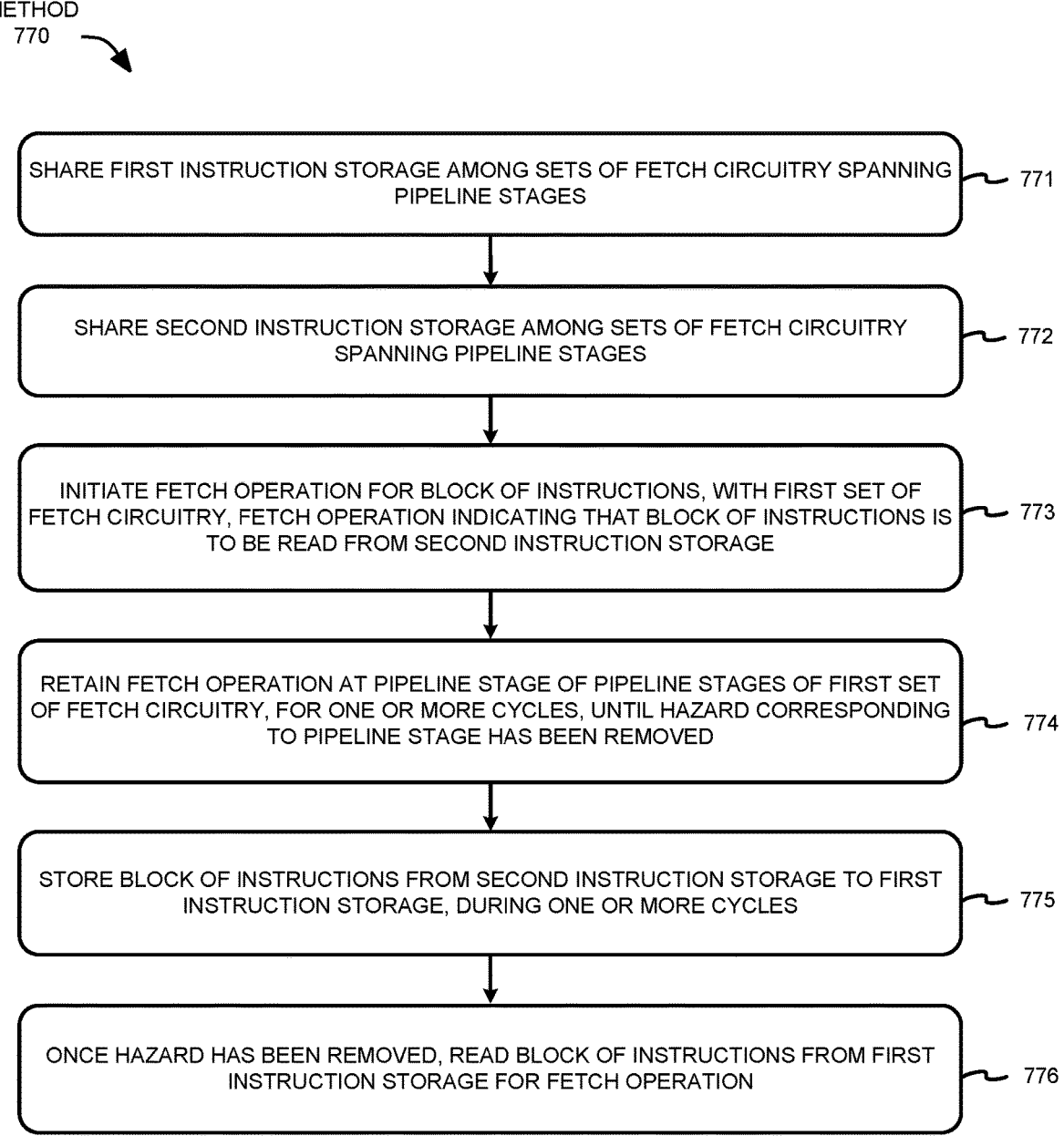

SHARE FIRST INSTRUCTION STORAGE AMONG SETS OF FETCH CIRCUITRY SPANNING PIPELINE STAGES — 771

SHARE SECOND INSTRUCTION STORAGE AMONG SETS OF FETCH CIRCUITRY SPANNING PIPELINE STAGES — 772

INITIATE FETCH OPERATION FOR BLOCK OF INSTRUCTIONS, WITH FIRST SET OF FETCH CIRCUITRY, FETCH OPERATION INDICATING THAT BLOCK OF INSTRUCTIONS IS TO BE READ FROM SECOND INSTRUCTION STORAGE — 773

RETAIN FETCH OPERATION AT PIPELINE STAGE OF PIPELINE STAGES OF FIRST SET OF FETCH CIRCUITRY, FOR ONE OR MORE CYCLES, UNTIL HAZARD CORRESPONDING TO PIPELINE STAGE HAS BEEN REMOVED — 774

STORE BLOCK OF INSTRUCTIONS FROM SECOND INSTRUCTION STORAGE TO FIRST INSTRUCTION STORAGE, DURING ONE OR MORE CYCLES — 775

ONCE HAZARD HAS BEEN REMOVED, READ BLOCK OF INSTRUCTIONS FROM FIRST INSTRUCTION STORAGE FOR FETCH OPERATION — 776

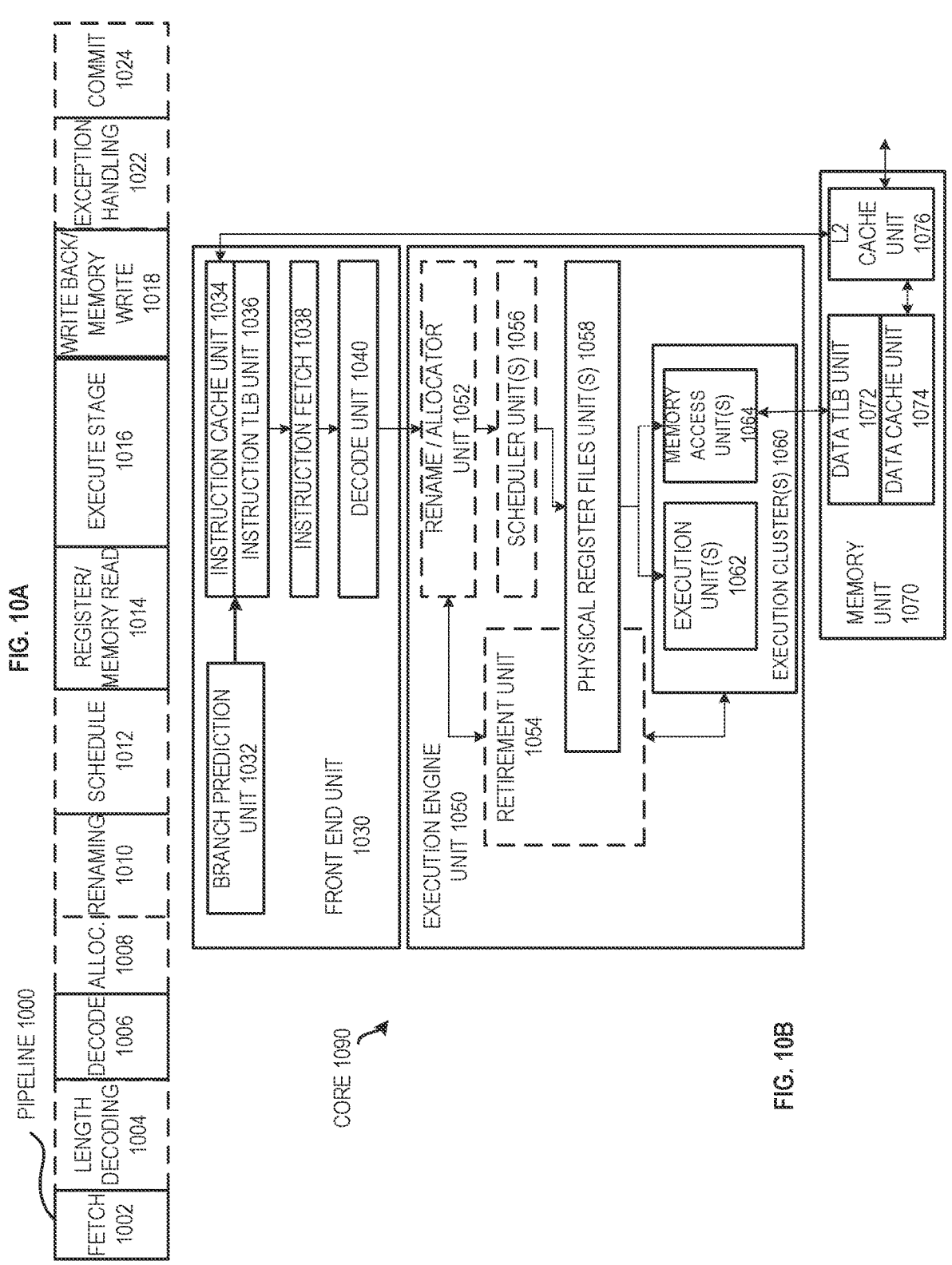

PIPELINE 1000

| FETCH 1002 | LENGTH DECODING 1004 | DECODE 1006 | ALLOC. 1008 | RENAMING 1010 | SCHEDULE 1012 | REGISTER/ MEMORY READ 1014 | EXECUTE STAGE 1016 | WRITE BACK/ MEMORY WRITE 1018 | EXCEPTION HANDLING 1022 | COMMIT 1024 |

FIG. 10B

CORE 1090

FRONT END UNIT 1030

BRANCH PREDICTION UNIT 1032

INSTRUCTION CACHE UNIT 1034

INSTRUCTION TLB UNIT 1036

INSTRUCTION FETCH 1038

DECODE UNIT 1040

EXECUTION ENGINE UNIT 1050

RENAME / ALLOCATOR UNIT 1052

RETIREMENT UNIT 1054

SCHEDULER UNIT(S) 1056

PHYSICAL REGISTER FILES UNIT(S) 1058

EXECUTION CLUSTER(S) 1060

EXECUTION UNIT(S) 1062

MEMORY ACCESS UNIT(S) 1064

MEMORY UNIT 1070

DATA TLB UNIT 1072

DATA CACHE UNIT 1074

L2 CACHE UNIT 1076

WRITE MASK REGISTERS 1126

16-WIDE VECTOR ALU 1128

SWIZZLE 1120

VECTOR REGISTERS 1114

NUMERIC CONVERT 1122B

REPLICATE 1124

NUMERIC CONVERT 1122A

L1 DATA CACHE 1106A

INSTRUCTION DECODE 1100

VECTOR UNIT 1110

VECTOR REGISTERS 1114

SCALAR UNIT 1108

SCALAR REGISTERS 1112

L1 CACHE 1106

LOCAL SUBSET OF THE L2 CACHE 1104

RING NETWORK 1102

STALLING AN INSTRUCTION FETCH OPERATION IMPACTED BY A HAZARD WITHOUT STALLING ANOTHER INSTRUCTION FETCH OPERATION NOT IMPACTED BY THE HAZARD

BACKGROUND

Technical Field

Embodiments described herein generally relate to processors. In particular, embodiments described herein generally relate to fetching instructions in processors.

Background Information

Processors and other instruction processing apparatus commonly include instruction fetch units to fetch instructions for other units to process. During operation, various types of pipeline hazards can occur that can hinder the fetch unit from fetching further instructions and thereby generally tend to reduce fetch throughput.

BRIEF DESCRIPTION OF THE DRAWINGS

The invention may best be understood by referring to the following description and accompanying drawings that are used to illustrate embodiments. In the drawings:

FIG. 3 is a block flow diagram of a method of fetching instructions, which includes retaining a fetch operation for a first block of instructions due to a hazard, while advancing a fetch operation for a second block of instructions, according to some embodiments.

FIG. 5 is a diagram illustrating an example flow of fetch operations for blocks of instructions through a fetch unit when a hazard occurs in a pipeline stage and resteer handling is used.

FIG. 7 is a block flow diagram of a method of fetching instructions, which includes storing a block of instructions from a second instruction storage to a first instruction storage while a fetch operation is retained due to a hazard and reading the block of instructions from the first instruction storage when the fetch operation resumes, according to some embodiments.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Disclosed herein are embodiments of instruction fetch units, processors and systems including the instruction fetch units, and methods performed by the instruction fetch units. In the following description, numerous specific details are set forth (e.g., specific numbers of pipeline stages, apportionment of circuitry or logic between pipeline stages, numbers of fetch lanes, other microarchitectural details, processor configurations, sequences of operations, etc.). However, embodiments may be practiced without these specific details. In other instances, well-known circuits, structures and techniques have not been shown in detail to avoid obscuring the understanding of the description.

Figure 1:
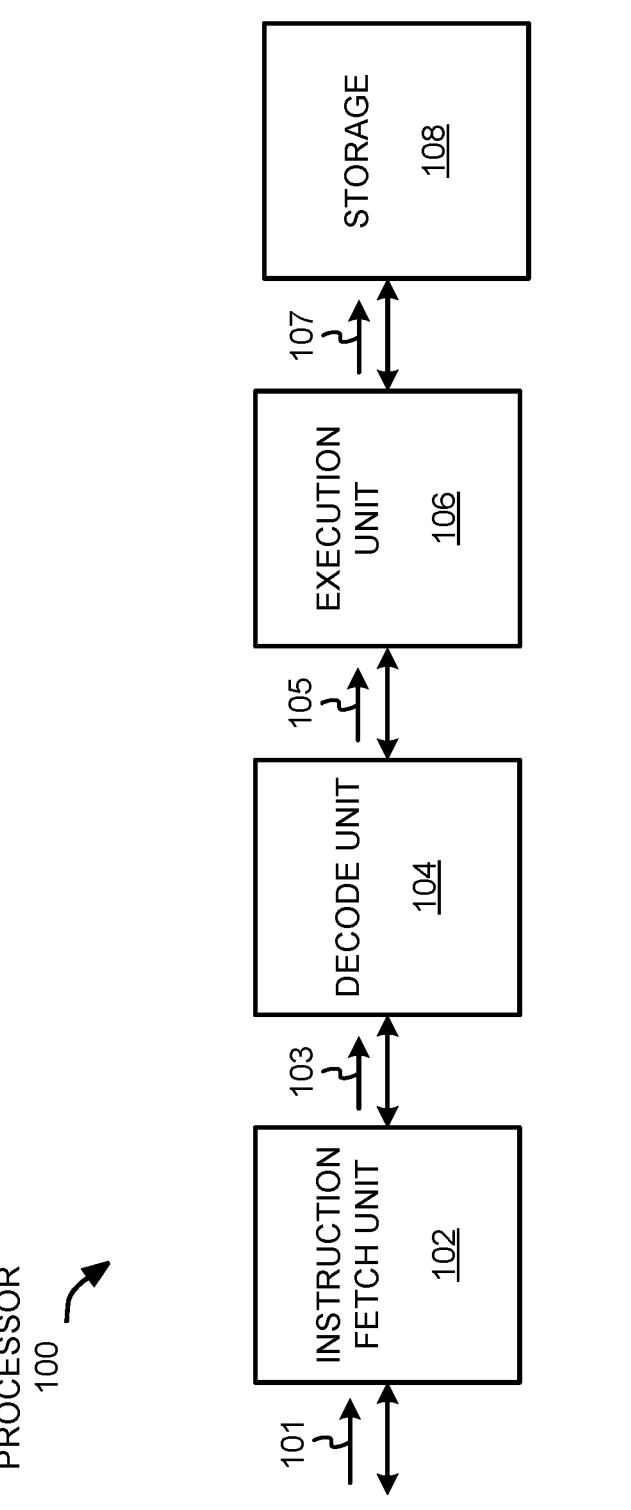
FIG. 1 is a block diagram of an embodiment of a processor in which some embodiments of the invention may be implemented.

FIG. 1 is a block diagram of an embodiment of a processor 100 in which some embodiments of the invention may be implemented. In some embodiments, the processor may be a general-purpose processor (e.g., a central processing unit (CPU) or other general-purpose microprocessor of the type used in servers, desktop, laptop, smart phones, or other computers). Alternatively, the processor may be a special-purpose processor. Examples of suitable special-purpose processors include, but are not limited to, network processors, communications processors, graphics processors, co-processors, digital signal processors (DSPs), embedded processors, and controllers (e.g., microcontrollers). The processor may be disposed on a semiconductor die or integrated circuit and may include hardware (e.g., transistors, circuitry, etc.).

The processor 100 has an instruction fetch unit 102, a decode unit 104, an execution unit 106, and storage 108. The instruction fetch unit or fetch unit may fetch instructions 101. The instructions 101 may represent macroinstructions, instructions of an instruction set of the processor, instructions that the decode unit 104 is able to decode, or the like. The fetch unit 102 may be coupled to receive the instructions

101 from on-die storage (not shown) of the processor, such as, for example, one or more caches, buffers, queues, or the like, and/or from system memory. The decode unit 104 is coupled with the fetch unit 102 to receive the fetched instructions 103 (e.g., the same instructions but reordered), and may be operable to decode the fetched instructions into 103 one or more relatively lower-level instructions or control signals 105 (e.g., one or more microinstructions, micro-operations, micro-code entry points, decoded instructions or control signals, etc.). The execution unit 106 may be coupled with the decode unit to receive the one or more lower level instructions or control signals 105 and may be operable to generate corresponding results 107. The results 107 may be stored in on-die storage 108 of the processor (e.g., registers, caches, etc.) or in memory.

To avoid obscuring the description, a relatively simple processor 100 has been shown and described. Other processors may include multiple decode units, multiple execution units, and so on. Also, the processor may optionally include other processor components, such as those shown and described below for any of FIGS. 10B, 11A-B, and 12.

Figure 2:
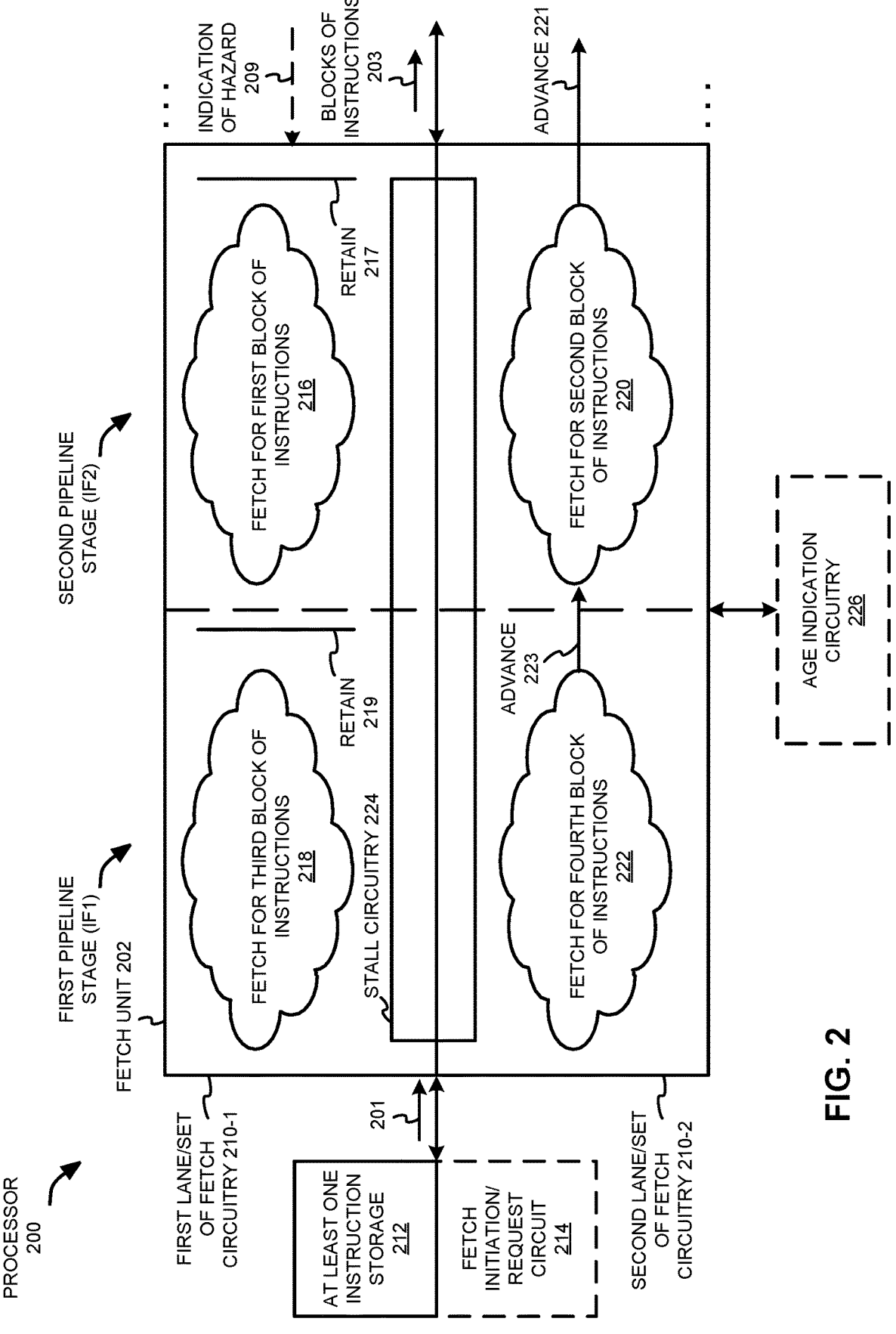
FIG. 2 is a block diagram of a processor having a fetch unit to retain a fetch operation for a first block of instructions due to a hazard, while advancing a fetch operation for a second block of instructions, according to some embodiments.

FIG. 2 is a block diagram of a processor 200 having a fetch unit 202 to retain a fetch operation 216 for a first block of instructions due to a hazard, while advancing a fetch operation 220 for a second block of instructions, according to some embodiments. The processor may be a general-purpose processor or special-purpose processor of the types previously described.

The fetch unit 202 is coupled with at least one instruction storage 212. The at least one instruction storage may store blocks of instructions 201 to be fetched by the fetch unit. Each of the blocks of instructions may include a plurality of instructions packed or combined together. In various embodiments, the blocks of instructions may include a cache line of instructions, a half, quarter, or other fraction of a cache line of instructions, a 128-bit, 256-bit, 512-bit, 1024-bit, or other fixed sized block of instructions, or the like. In one specific example, each of the blocks of instructions is a single 512-bit cache line of instructions, although this is not required. Examples of suitable instruction storage include, but are not limited to, one or more instruction caches, one or more unified caches (e.g., that cache both instructions and data), one or more instruction buffers or queues (e.g., a buffer used to store instructions being transferred between caches, other types of instruction storage, and various combinations thereof (e.g., a level 0 (L0) instruction cache, a level 1 (L1) instruction cache, and an instruction streaming buffer (ISB) used to store instructions being stored from a level 2 (L2) cache into the L1 cache).

The fetch unit may receive indications of, or otherwise determine, the blocks of instruction 201 to be fetched. In some cases, the fetch unit may be coupled with an optional instruction fetch initiation or request circuit 214 to receive pointers to or addresses of the blocks of instructions to be fetched. Examples of suitable instruction fetch initiation or request circuits include, but are not limited to, one or more program counters, instruction counters, instruction pointers, instruction address registers, instruction sequencers, or the like. In one specific example embodiment, the instruction fetch initiation or request circuit may include a queue of pointers to, or addresses of, the blocks of instructions. Alternatively, the fetch unit may itself determine the blocks of instructions to be fetched.

The fetch unit 202 may be operable to use the pointers, addresses, or other indications of the blocks of instructions to fetch or otherwise obtain the blocks of instructions 201 from the at least one instruction storage 212. In some cases, previously either the fetch unit and/or another unit (e.g., a prefetch unit) may fetch or prefetch the instructions from memory into the at least one instruction storage. The fetch unit may output the blocks of fetched instructions 203, for example, to a queue, buffer, or other instruction storage, or to a decode unit or other consumer of the fetched instructions. The fetch unit may generally organize and provide the fetched instructions according to program order.

The fetch unit 202 may be pipelined. Processors and their components are commonly pipelined. A pipeline broadly represents a set of data processing circuitry or logic connected in series such that the output of each data processing circuitry or logic serves as the input of the next data processing circuitry or logic in the series. These sets of data processing circuitry or logic are referred to as stages of the pipeline, pipeline stages, or pipestages. The use of these distinct stages effectively divides the overall data processing or work into a series of sequential portions each performed by a different one of the sets of data processing logic or stages. Such pipelining allows overlapping different data processing with the same circuitry. The illustrated pipelined fetch unit 202 has a plurality of pipeline stages, including a first pipeline stage (instruction fetch pipeline stage one (IF1)), a second pipeline stage (instruction fetch pipeline stage 2 (IF2), and optionally one, two, three, four, or more other pipeline stages. Each of the pipeline stages may perform a portion of the overall data processing, work, or instruction fetching operations, and pass their results onto the next subsequent pipeline stage.

The fetch unit 202 also includes a plurality of lanes or other sets of fetch circuitry, including a first lane or other set of fetch circuitry 210-1 and a second lane or other set of fetch circuitry 210-2. In the illustration only two lanes or sets of fetch circuitry are shown, although there may be two, three, four, five, six, or more lanes or other sets of fetch circuitry. Each of the lanes or sets of fetch circuitry may span or otherwise have all of the same plurality of pipeline stages, including at least the first and second pipeline stages. Each lane or set of fetch circuitry may be operative, at least at times, to substantially concurrently perform fetch operations to fetch a corresponding block of instructions from the at least one instruction storage during the same cycle. In this way, the fetch unit may be considered to be superscalar and able to concurrently perform multiple fetch operations to fetch multiple blocks of instructions each cycle (e.g., one block of instructions per lane of fetch circuitry). This generally helps to provide more fetch throughput. The lanes or sets of fetch circuitry may at least conceptually represent different concurrent fetch pipelines. Each lane or set of fetch circuitry may have its own replicated set of fetch circuitry for some, most, or potentially all of the pipeline stages.

During operation, the fetch unit may the fetch unit may receive an indication of a hazard (e.g., a pipeline hazard) 209 and/or a hazard may occur that impacts one of the lanes or sets of fetch circuitry. The term "hazard" is used broadly herein to refer to any of various sorts of problems, events, conditions, or other situations that necessitate or at least justify a pipeline stall of one or more stages of at least one lane or set of fetch circuitry for one or more clock cycles. Specific examples of possible hazards include, but are not limited to, an indication that a subsequent pipeline stage (e.g., a decode stage) cannot accept additional fetched blocks of instructions the next cycle, an indication that a queue in a subsequent pipeline stage is full or otherwise unable or unwilling to receive additional fetched blocks of instructions the next cycle, and other problems, events, conditions, or other situations that hinder a fetch operation for a block of instructions from advancing from a certain pipeline stage to the next pipeline stage of a lane or set of fetch circuitry.

The fetch unit also has an embodiment of stall circuitry 224. In some embodiments, in response to and/or as a result of and/or due to the hazard, which is for and/or which impacts a given pipeline stage of the plurality of pipeline stages, and which is for and/or which impacts a given lane or set of fetch circuitry, the stall circuitry may be operative to selectively stall, prevent advancement of, hold back, or otherwise retain a fetch operation for a first block of instructions at the given pipeline stage of the given lane or set of fetch circuitry (e.g., those impacted by the hazard), for one or more cycles, until the hazard has been removed (e.g., for as many cycles as it takes until the hazard has been removed). Likewise, in some embodiments, the stall circuitry may be operative to selectively retain any (e.g., zero or more) fetch operations for any (e.g., zero or more) corresponding blocks of instructions at any (e.g., zero or more) preceding pipeline stages (e.g., any of those that precede the given pipeline stage) of the given lane or set of fetch circuitry (e.g., those impacted by the hazard), for these one or more cycles. In contrast, the stall circuitry may be operative to selectively not stall, not retain, move forward, cause to progress, or otherwise advance a fetch operation for a second block of instructions from the given pipeline stage to the next sequential pipeline stage of at least one other lane or set of fetch circuitry (e.g., those not impacted by the hazard), during the initial, earliest, or very first cycle, of these one or more cycles. In some embodiments, all fetch operations in these other lanes or sets of fetch circuitry may potentially similarly advance and may continue to advance irrespective of the hazard impacting the given lane or set of fetch circuitry.

In the specific illustrated example of FIG. 2, the indication of the hazard 209 is for and/or impacts the second pipeline stage (IF2) and is for and/or impacts the first lane or set of fetch circuitry 210-1. As a result, the stall circuitry 224 may be operative to selectively retain 217 a fetch operation 216 for a first block of instructions at IF2 of the first lane or set of fetch circuitry 210-1, for one or more cycles, until the hazard has been removed. Likewise, in some embodiments, the stall circuitry 224 may be operative to selectively retain 219 a fetch operation 218 for a third block of instructions at the preceding first pipeline stage (IF1) of the first lane or set of fetch circuitry 210-1, for these same one or more cycles, until the hazard has been removed. In one aspect, all fetch operations preceding the fetch operation 216 in the first lane or set of fetch circuitry may be retained for these same one or more cycles. In contrast, the stall circuitry 224 may be operative to selectively advance 221 a fetch operation 220 for a second block of instructions from the second pipeline stage (IF2) to the next sequential pipeline stage of the second lane or set of fetch circuitry 210-2 (e.g., since it is not impacted by the hazard), during the initial, earliest, or very first cycle of the one or more cycles. In one aspect, all fetch operations in the second lane or set of fetch circuitry may similarly be allowed to advance (e.g., since they are not impacted by the hazard), during these one or more cycles, and some may potentially exit the last pipeline stage of the fetch unit. These fetch operations are shown in the illustrations inside clouds to indicate that they only reside there when the fetch unit is currently in operation and powered on.

Rather than stalling or otherwise retaining fetch operations for all lanes or sets of fetch circuitry for the entire given pipeline stage (e.g., IF2), the stalling or retaining may be performed selectively for one or more, but only a subset, of all lanes or sets of fetch circuitry for the given pipeline stage (e.g., IF2). In some embodiments, only those fetch operations impacted by the hazard may be retained while all those not impacted by the hazard may be advanced. Advantageously, this may help to improve fetch throughput, since instead of losing cycles of work for all fetch operations at the given pipeline stage, cycles of work may be performed on the fetch operations advanced from the given pipeline stage (e.g., those not directly impacted by the hazard), whereas cycles of work are only lost for one or more, but only a subset, of the fetch operations that are retained (e.g., those directly impacted by the hazard). An alternate possible approach would be to stall the fetch operations for all lanes or sets of fetch circuitry at the given pipeline stage (e.g., IF2) and/or stall at whole pipeline stage granularity. However, for this alternate possible approach, cycles of work may be lost for all fetch operations at the given pipeline stage (e.g., IF2) including for some that need not be stalled because they are not directly impacted by the hazard.

In some embodiments, when the indication of the hazard 209 is for and/or which impacts the second pipeline stage (IF2), and is for and/or which impacts the first lane or set of fetch circuitry 210-1, in some embodiments, the stall circuitry 224 may optionally be operative to advance a newer, younger, or more recent fetch operation 222 for a fourth block of instructions from the immediately preceding first pipeline stage (IF1), of the second lane or set of fetch circuitry 210-2 (i.e., the same one in which the fetch operation for the second block of instructions was advanced), into the next sequential second pipeline stage (IF2), during the very first, initial, or earliest cycle of the one or more cycles, until the hazard has been removed. This may allow the newer, younger, or more recent fetch operation 222 of the second lane or set of fetch circuitry (e.g., one not impacted by the hazard) to be merged with, combined with, or otherwise be introduced into, the same second pipeline stage (IF2) as the retained fetch operation 216 of the first lane or set of fetch circuitry (e.g., one impacted by the hazard). These newer, younger, or more recent fetch operations are not merely no-operations (NOPs), or other types of bubbles which preform not useful work, but rather are actual fetch operations able to perform actual work during these cycles.

Advantageously, this may help to increase fetch throughput by allowing further processing of the fetch operation 222 to be performed during the cycles while the hazard is being removed. An alternate possible approach would be to allow the fetch operations 220 for the second block of instructions to advance through and potentially empty from the pipeline stages while the fetch operation 216 for the first block of instructions is stalled, and then allow the fetch operation 216 for the first block of instructions to advance through and empty from the pipeline stages, prior to allowing the newer, younger, or more recent fetch operation 222 for the fourth block of instructions to advance through the pipeline stages. One reason to do this is to preserve the relative age or seniority of the fetch operations. However, this tends to reduce fetch throughput compared to the previously described approach, since work is not done on the fetch operation 222 for the fourth block of instructions during the cycles in which it is not advanced.

In some embodiments, the fetch unit may optionally include age indication circuitry 226. The age indication circuitry may be operative to monitor and indicate a relative age or seniority of fetch operations. As mentioned above, younger fetch operations may be allowed to merge or otherwise be introduced into the same pipeline stage as a stalled or retained older fetch operation. As used herein, the terms younger, older, oldest, and the like are relative terms not absolute terms (e.g., the younger is younger than the older, the oldest is older than all others, etc.). After the hazard has been removed, the younger and older fetch operations may then advance together through the remaining pipeline stages. The age indication circuitry may help to monitor and provide age or seniority related information so that the fetch unit is able to organize and deliver the fetched blocks of instructions according to the age or seniority of the fetch operations (e.g., based on or according to program order).

In some embodiments, the age indication circuitry may be operative to determine and indicate the oldest fetch operation at each pipeline stage. As one example, each instruction fetch pipeline stage may have a pointer to indicate which fetch operation is oldest and/or which lane or set of fetch circuitry holds the oldest fetch operation. Alternatively, a tag, marker or other approach may optionally be used. Any of various such age indicators or age indication circuitry may indicate or preserve the age or seniority of the fetch operations. The oldest may be determined based on the current oldest and the coming stall conditions. For example, starting from the current oldest, the first fetch that will stall in place may become the next oldest (e.g., for the next cycle). If none is stalled, then the next oldest may be decided by the oldest out of the newly loaded fetches to that pipeline stage. Also, in some embodiments, the program order may also optionally be maintained by implementing a policy that if a fetch operation is retained at a certain pipeline stage (e.g., IF2), then all the younger fetch operations in that same pipeline stage may also be retained as well. Similarly, the stall may be propagated backward in each corresponding lane all the way to the first pipeline stage (IF1). The age indication circuitry may be operative (e.g., intelligent enough) to monitor and indicate the oldest fetch and that oldest fetch operation does not need to be in the first lane or any other particular lane, but rather can be in any of the lanes.

FIG. 3 is a block flow diagram of a method 330 of fetching instructions, which includes retaining a fetch operation for a first block of instructions due to a hazard, while advancing a fetch operation for a second block of instructions, according to some embodiments. In various embodiments, the method may be performed by a fetch unit, fetch circuitry, a processor, instruction processing apparatus, digital logic device, or integrated circuit. In some embodiments, the method 330 may be performed by and/or with the processors and/or fetch units of FIG. 1 and/or FIG. 2. The components, features, and specific optional details described herein for the processors and fetch units of FIG. 1 and/or FIG. 2 also optionally apply to the method 330. Alternatively, the method 330 may be performed by and/or within a similar or different fetch unit, processor, or apparatus. Moreover, the fetch units and/or processors of FIG. 1 and/or FIG. 2 may perform methods the same as, similar to, or different than the method 330.

The method includes storing instructions in at least one instruction storage, at block 331. The previously described types of instruction storage are suitable. Then, the method includes concurrently initiating a fetch operation for a first block of instructions from the at least one instruction storage with a first set of fetch circuitry, and initiating a fetch operation for a second block of instructions from the at least one instruction storage with a second set of fetch circuitry, at block 332. In some embodiments, the blocks of instructions are optionally cache lines of instructions (e.g., 512-bit cache lines), although this is not required. The first and second sets of fetch circuitry each have or span a same plurality of pipeline stages. In some embodiments, the first and second sets of fetch circuitry are two of at least three, at least four, or at least five sets of fetch circuitry, and each of the sets of fetch circuitry span from about three to five pipeline stages, although the scope of the invention is not so limited.

At block 333, an indication of a hazard is received for (or a hazard occurs which impacts) a given pipeline stage of the plurality of pipeline stages of the first set of fetch circuitry. At block 334, the fetch operation for the first block of instructions is retained at the given pipeline stage of the first set of fetch circuitry, for one or more cycles, until the hazard has been removed. Also, at block 335, any (e.g., zero or more) fetch operations for any (e.g., zero or more) corresponding blocks of instructions may be retained at any (e.g., zero or more) preceding pipeline stages of the first set of fetch circuitry, for these one or more cycles. In contrast, at block 335, the fetch operation for the second block of instructions may be advanced from the given pipeline stage of the second set of fetch circuitry, during an initial, earliest, or very next cycle of these one or more cycles. Advantageously, allowing the fetch operation for the second block of instructions to advance, instead of being retained, may help to improve fetch throughput and reduce power (e.g., by avoiding losing one or more whole cycles of work for all lanes of fetch circuitry).

In some embodiments, a newer, younger, or more recent fetch operation for a third block of instructions may optionally be advanced from an immediately preceding pipeline stage of the second set of fetch circuitry into the given pipeline stage of the second set of fetch circuitry, during the initial, earliest, or very next cycle of these one or more cycles. Advantageously, advancing the third block of instructions into the same pipeline stage as the stalled first block of instructions (e.g., instead of the third block being retained) may help to improve fetch throughput and reduce power (e.g., by letting partial work continue to progress and merge or combine with older work that has been stalled or retained).

The method 330 has been described in a relatively basic form but operations may optionally be added to and/or removed from the method. For example, an operation may optionally be added to indicate relative age or seniority information of the fetch operations at a given pipeline stage (e.g., indicate an oldest fetch operation at the given pipeline stage). In addition, while the flow diagrams show a particular order of operations according to embodiments, that order is exemplary. Alternate embodiments may perform the operations in different order, combine certain operations, overlap certain operations, etc. For example, in another embodiment, block 336 may optionally be omitted.

Figure 4:
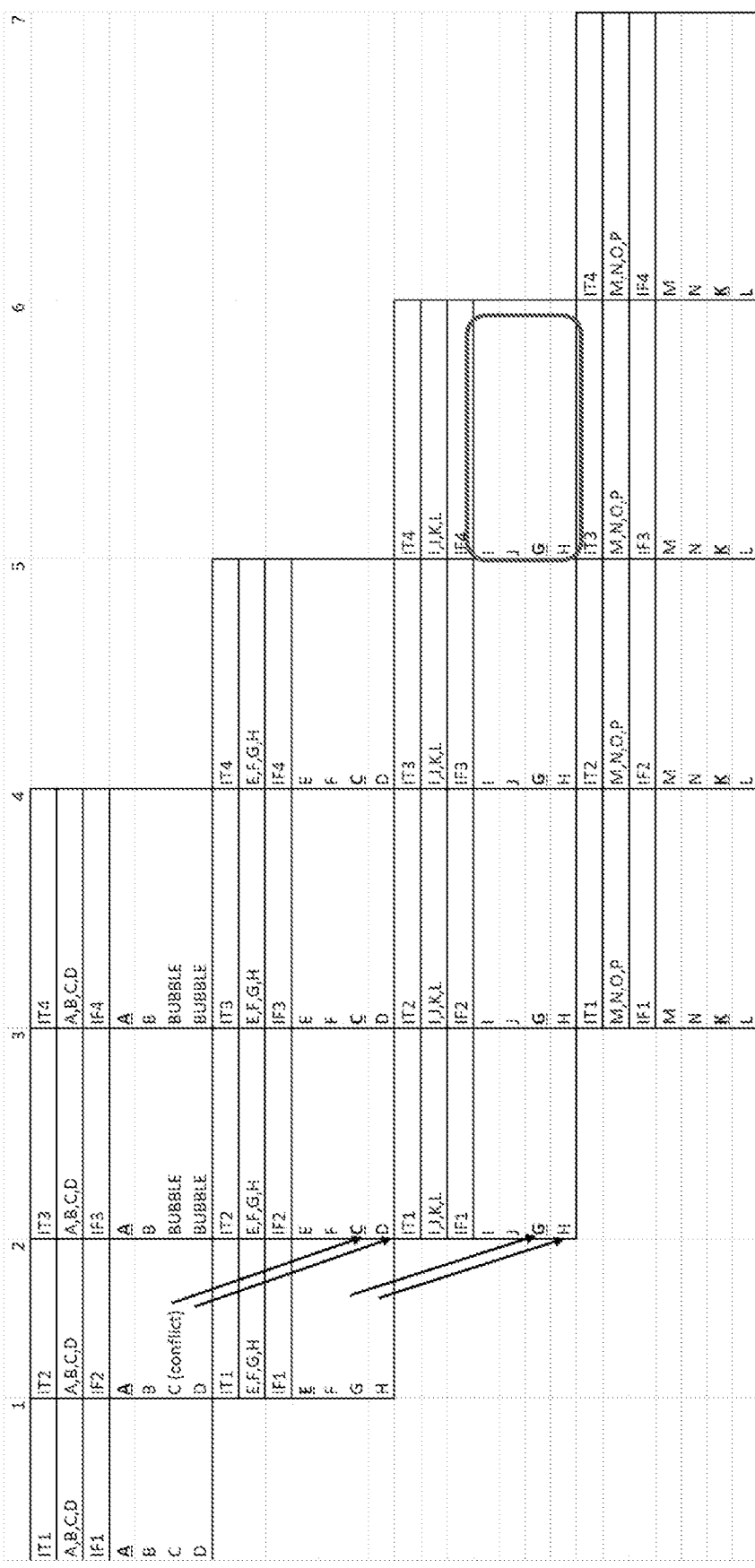
FIG. 4 is a diagram illustrating an example flow of fetch operations for blocks of instructions through a fetch unit when a hazard occurs in a pipeline stage and a stall and merge approach is used, according to some embodiments.

FIG. 4 is a diagram illustrating an example flow of fetch operations for blocks of instructions through a fetch unit when a hazard occurs in a pipeline stage and a stall and merge approach is used, according to some embodiments. The fetch unit in this example has four lanes or sets of fetch circuitry spanning four instruction fetch pipeline stages (IF1, IF2, IF3, IF4), although this is only one example. The fetch operations for the blocks of instructions are represented by the letters A, B, C, D, E, F, G, H, and so on. Underlined letters designate the oldest fetch operation at the pipeline stage. Prior to the hazard, four fetch operations A, B, C, and D start to move together as a group in the same pipeline stage and move from IF1 to IF2. In this example, the hazard or "conflict" occurs in the second instruction fetch pipeline stage (IF2). The hazard impacts fetch operation C. As a result of the hazard, as shown by the arrows, the two younger fetch operations C and D are retained at IF2 while the two older fetch operations A and B advanced into IF3. NOPs or other bubbles are effectively introduced into IF3 and IF4 due to retaining the fetch operations C and D. At the same time, the newer or younger fetch operations E and F (of a set of four fetch operations E, F, G, and H in IF1) advance from IF1 and merge or combine into the same pipeline stage (IF2) with the retained fetch operations C and D in the same lines having A and B. The fetch operation C is at that point designated to be the oldest fetch operation in that pipeline stage to indicate that it is older than E and F even though they are in the upper lanes typically used to hold the oldest fetch operations. The fetch operations E, F, C, and D then each clock cycle through the remaining pipeline stages.

Figure 5:
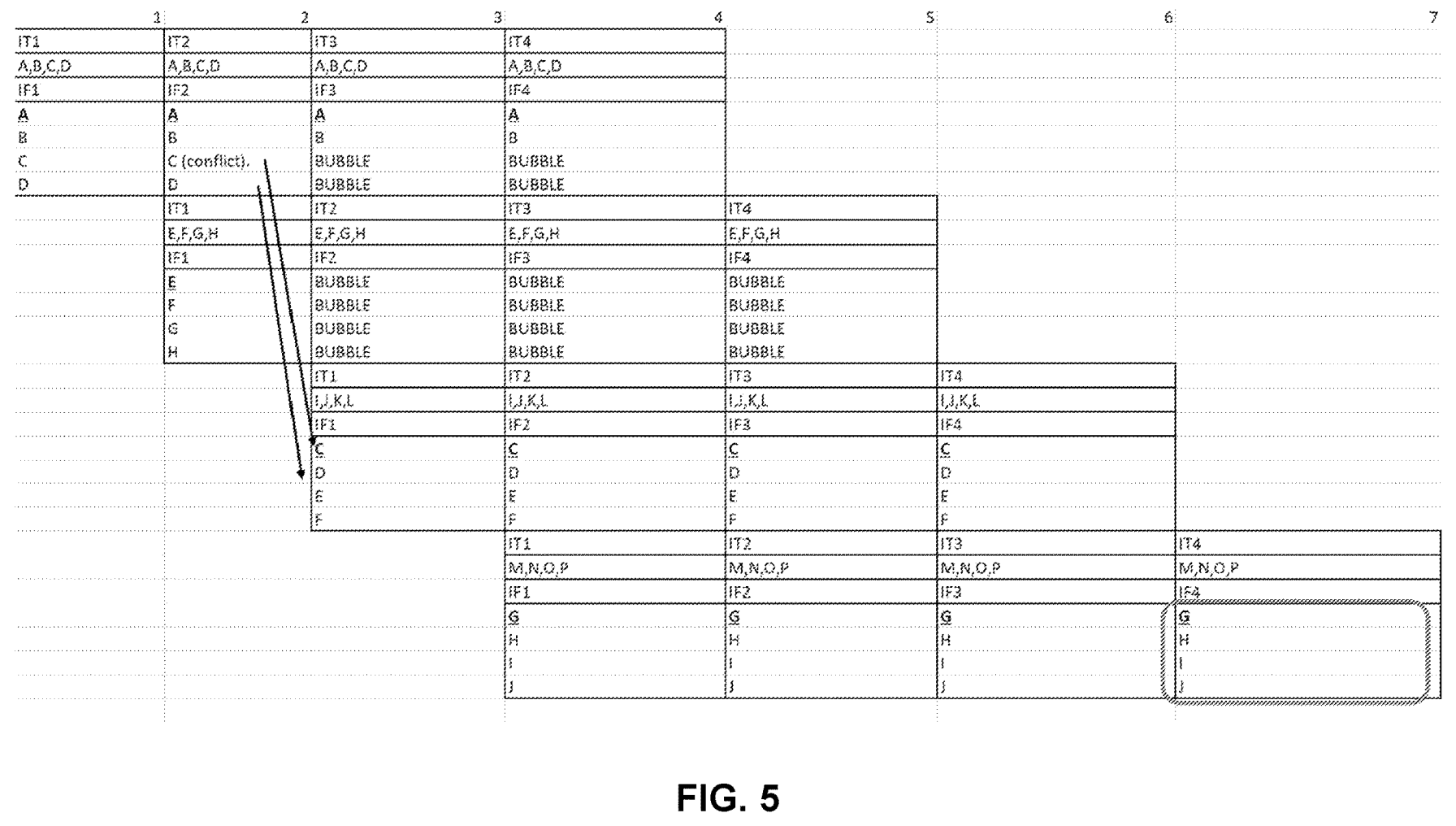

FIG. 5 is a diagram illustrating an example flow of fetch operations for blocks of instructions through a fetch unit when a hazard occurs in a pipeline stage and resteer handling is used instead of the stall and merge approach. The differences relative to FIG. 4 will primarily be described without repeating what is similar. As a result of the hazard in IF2 for fetch operation C, as shown by the arrows, the two younger fetch operations C and D are retained at IF2 while the two older fetch operations A and B advanced into IF3. NOPs or other bubbles are effectively introduced into IF3 and IF4 due to retaining the fetch operations C and D. With this approach, the newer or younger fetch operations E and F (of a set of four fetch operations E, F, G, and H in IF1) do not advance from IF1 and merge or combine into the same pipeline stage (IF2) with the retained fetch operations C and D. Rather, after the hazard fetch operations C, D, E, and F are again fetched into IF1 with C. Notice that this introduces significantly more bubbles, representing lost work, into the pipeline stages for fetch operations E, F, G, and H. In this case, the approach of FIG. 4 offers a 4 fetch gain over the approach of FIG. 5 (e.g., fetches G, H, I and J make it to IF4 in cycle 6 with the stall-and-merge approach of FIG. 4, but not until cycle 7 with the full resteer approach of FIG. 5).

Figure 6:
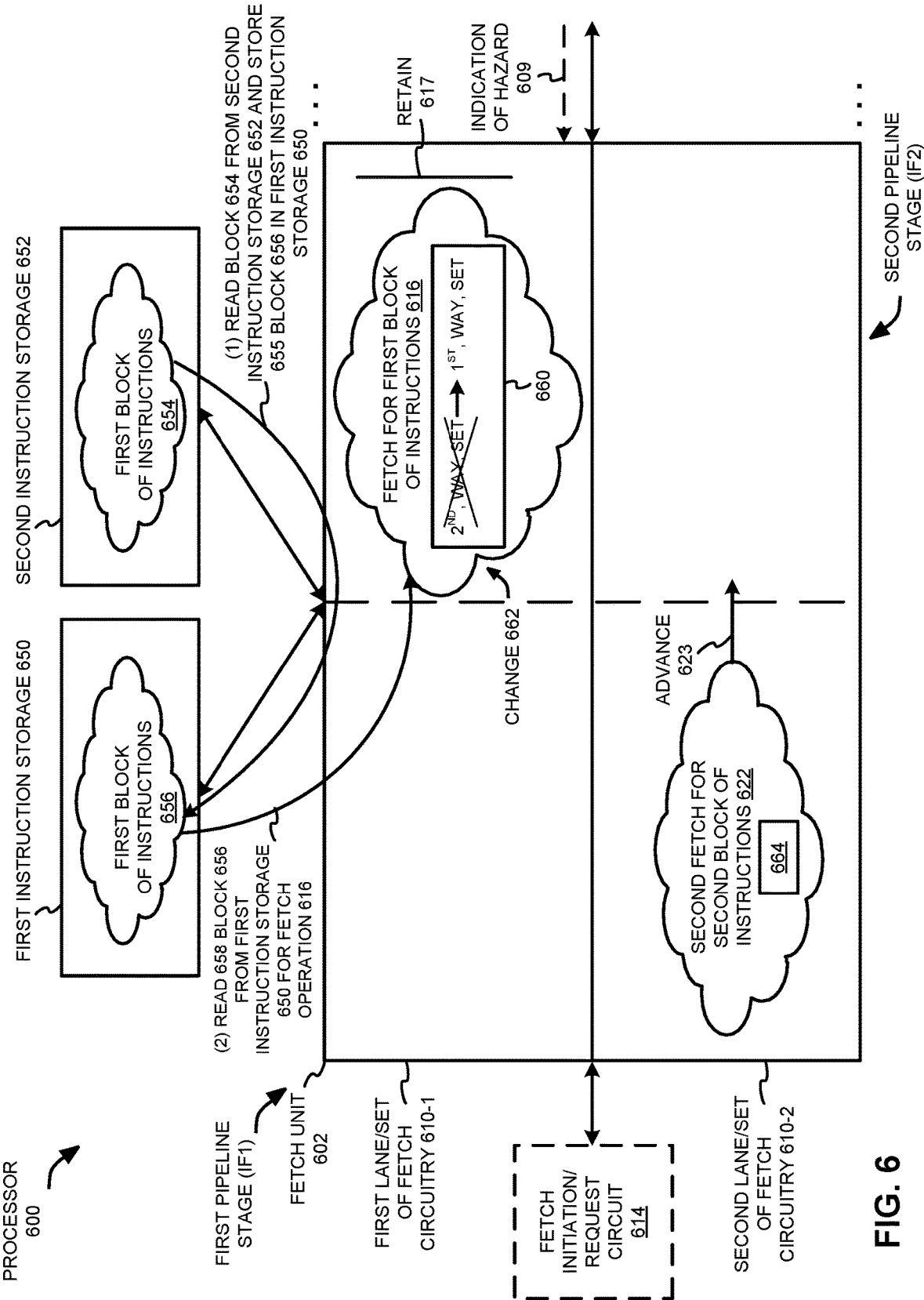
FIG. 6 is a block diagram of a processor having a fetch unit to store a block of instructions from a second instruction storage to a first instruction storage while a fetch operation is retained due to a hazard and read the block of instructions from the first instruction storage when the fetch operation resumes, according to some embodiments.

FIG. 6 is a block diagram of a processor 600 having a fetch unit 602 to store 655 a block of instructions 654 from a second instruction storage 652 to a first instruction storage 650 while a fetch operation 616 is retained due to a hazard and read 658 the block of instructions 656 from the first instruction storage 650 when the fetch operation resumes, according to some embodiments. The processor may be a general-purpose processor or special-purpose processor of the types previously described.

The processor includes a first instruction storage 650 and a second instruction storage 652. The first and second instruction storage are each operable to store blocks of instructions to be fetched by the fetch unit 602. Examples of suitable instruction storage include, but are not limited to, one or more instruction caches, one or more unified caches (e.g., that cache both instructions and data), one or more instruction buffers or queues (e.g., a buffer used to store instructions being transferred between caches, other types of instruction storage, and various combinations thereof (e.g., an L0 instruction cache, an L1 instruction cache, and an instruction streaming buffer (ISB)). In some embodiments, the first and second instruction storage may both be caches. For example, the first instruction storage may be an L0 instruction cache, and the second instruction storage may be an L1 instruction cache. In other embodiments, the first instruction storage need not be a cache, but could be another type of instruction storage.

The fetch unit 602 is coupled with the first instruction storage 650 and the second instruction storage 652. In some cases, the fetch unit may be coupled with an optional instruction fetch initiation or request circuit 614 to receive pointers to or addresses of the blocks of instructions to be fetched, as previously described. Alternatively, the fetch unit may itself determine the blocks of instructions to be fetched. The fetch unit may be operable to use the pointers, addresses, or other indications of the blocks of instructions to fetch or otherwise obtain the blocks of instructions from the first instruction storage and the second instruction storage. The fetch unit may output the blocks of fetched instructions (e.g., to a queue, decoder, etc.), as previously described. The blocks of instructions may be cache lines of instructions, or other blocks of instructions previously described.

The fetch unit 602 is pipelined. The illustrated fetch unit has a plurality of pipeline stages, including a first pipeline stage (instruction fetch pipeline stage one (IF1)) and a second pipeline stage (instruction fetch pipeline stage two (IF2)), and optionally more. In various embodiments, the number of pipeline stages may be two, three, four, five, six, or more pipeline stages. Each of the pipeline stages may perform a portion of the overall data processing, work, or instruction fetching operations, and pass their results onto the next subsequent pipeline stage.

The fetch unit 602 includes a plurality of lanes or other sets of fetch circuitry, including a first lane or other set of fetch circuitry 610-1 and a second lane or other set of fetch circuitry 610-2. In the illustration only two lanes or other sets of fetch circuitry are shown, although there may optionally be at least three (e.g., three, four, five, six, or more lanes or other sets of fetch circuitry). Each of the lanes or sets of fetch circuitry may span or otherwise have all the same plurality of pipeline stages, including the first and second pipeline stages. Each lane or set of fetch circuitry may be operative, at least at times, to concurrently perform fetch operations to fetch a corresponding block of instructions (e.g., from the first and second instruction storage) during the same cycle. The lanes or sets of fetch circuitry may therefore share access to the first and second instruction storage (e.g., share access to their read ports). Each lane or set of fetch circuitry may have its own replicated set of fetch circuitry for some, most, or all (but not necessarily all) of the pipeline stages.

During operation, the fetch unit may receive an indication of a hazard 609 that is for and/or that impacts a given pipeline stage and a given lane or set of fetch circuitry. In this example, the hazard is for and/or impacts the second pipeline stage IF2 and is for and/or impacts the first lane or set of fetch circuitry 610-1. In some embodiments, in response to and/or as a result of and/or due to the indication of the hazard, the fetch unit and/or the first lane or set of fetch circuitry 610-1 may be operative to stall, prevent advancement of (e.g., by gating a clock), or otherwise retain 617 a fetch operation 616 for a first block of instructions in the second pipeline stage IF2 of the first lane or set of fetch circuitry 610-1, for one or more cycles, until the hazard has been removed (e.g., as many cycles as it takes until the hazard has been removed). This may be done as described elsewhere herein. Likewise, in some embodiments, any (e.g., zero or more) subsequent fetch operations for any (e.g., zero or more) corresponding blocks of instructions at any (e.g., zero or more) preceding pipeline stages of the first lane or set of fetch circuitry may also be retained, for the one or more cycles.

Initially, the fetch operation 616 may have an indication 660 that the first block of instructions is to be read from the second instruction storage 652. For example, the fetch operation 616 may initially have an indication to read from the L1 instruction cache, at a particular way, and at a particular set (e.g., "L1, way, set" as shown in the illustration). An earlier pipeline stage (e.g., the first pipeline stage IF1) may have evaluated available sources for the first block of instructions to determine that the first block of instructions is presently stored in and may be read from the second instruction storage. The earlier pipeline stage may also have evaluated read conflicts for the second instruction storage to determine that, at that time, the second instruction storage had enough read ports available to allow the first block of instructions to be read from the second instruction storage, along with any other fetch operations advancing from that earlier pipeline stage with the fetch operation for the first block of instructions, in the same cycle. This may include determining (at that earlier pipeline stage) what fetch operations need to go to the second instruction storage, and determining whether there are enough read ports on the second instruction storage to handle all of them that do. The fetch unit and/or the first set of fetch circuitry may have circuitry or logic (e.g., second instruction storage read port conflict resolution circuitry or logic) to make such determinations (e.g., evaluate read port conflicts on the second instruction storage for all fetch operations needing to read from the second instruction storage). Notice that such determinations may be based on conditions existing at the time these determinations were made. The fetch unit and/or the first set of fetch circuitry may also attach, append, mark, or otherwise provide or include the indication 660 that the fetch operation 616 for the first block of instructions is to read the first block from the second instruction storage 652 (e.g., "L1, way, set"). As one example, the fetch operation may represent a set of bits (e.g., a micro-op, micro-operation, micro-instruction, or other low level control signal) that has one or more fields to specify or otherwise indicate from which source (e.g., the first instruction storage, the second instruction storage, or other instruction storage), the fetch operation is to read the first block of instructions from.

In some embodiments, as shown at reference numeral (1), the fetch unit and/or the first set of fetch circuitry may be operative to read the first block of instructions 654 from the second instruction storage 652 and store 655 the first block of instructions 654 as a first block of instructions 656 in the first instruction storage 650, during the one or more cycles, until the hazard has been removed (e.g., in the initial, earliest, or very first cycle of the one or more cycles). In some embodiments, all blocks of instructions read from the second instruction storage may be stored in the first instruction storage, although this is not required. This may tend to offer a potential advantage of keeping cache lines of instructions relatively more likely to be used again soon in the first instruction storage (e.g., especially when there are backward jumps, backward branches, or loops in the code). In other embodiments, at least some or at least all blocks of instructions for stalled or retained fetch operations read from the second instruction storage may be stored in the first instruction storage, although this is not required.

In some embodiments, as shown at reference numeral (2) in the illustration, the fetch unit and/or the first set of fetch circuitry may be operative to read 658 the first block of instructions 656 from the first instruction storage 650 for the fetch operation 616. As mentioned, this may be done even though initially the indication 660 was provided or included to indicate that the first block of instructions was to be read from the second instruction storage 652. Also, this may be done even though initially available instruction sources of the first block of instructions were evaluated and it was determined that the first block of instructions was in the second instruction storage but not in the first instruction storage. In some embodiments, the source used to provide the first block of instructions may be changed dynamically from the second instruction storage to the first instruction storage after and/or due to the indication of the hazard 609. In some embodiments, the fetch unit and/or the first set of fetch circuitry may also optionally be operative to change 662 the indication 660 so that it is an indication that the first block of instructions is to be read from the first instruction storage (e.g., no longer the second instruction storage). For example, as shown in the illustration, the fetch unit and/or the first set of fetch circuitry may optionally be operative to overwrite, replace, or otherwise change an initial indication "$2^{nd}$, way, set" indicating a particular way and set in the second instruction storage to be an indication "$1^{st}$, way, set" to indicate a particular way and set in the first instruction storage. As one example, this may include changing a value of one or more bits or one or more fields of a set of bits representing the fetch operation 616 (e.g., changing a value of one or more bits or a field of a micro-op, micro-operation, micro-instruction, or other low level control signal). In some embodiments, the fetch unit and/or the second lane or set of fetch circuitry 610-2 may be operative to selectively advance 623 a second, newer, younger, or more recent fetch operation 622 for a second block of instructions, from a pipeline stage (e.g., in this example illustration the first pipeline stage IF1) immediately preceding the pipeline stage where the fetch operation 616 for the first block of instructions was retained (e.g., in this example illustration the second pipeline stage IF2), during an earliest or initial cycle of the one or more cycles, until the hazard has been removed. The terms newer, younger, and the like terms used herein are relative terms not absolute terms because the second fetch operation is newer or younger than the first fetch in fetch order and/or program order. This is optional not required. This may continue to happen for other of the one or more cycles as well but assume that the one or more cycles until the hazard has been removed is a single cycle. This may allow the second fetch operation 622 to be merged with, combined with, or otherwise be introduced into, the same pipeline stage in which the fetch operation 616 is retained (e.g., in this illustrated example the second pipeline stage IF2). At least in some cases, the second fetch operation may optionally have an indication 664 to read the second block of instructions from the second instruction storage. Then, when the hazard is removed, the fetch operation 616 and the second fetch operation 622 may both attempt to advance to the next sequential pipeline stage.

Now, one challenge with merging, combining, or introducing the second fetch into the same pipeline stage as the retained fetch operation is that it potentially introduces new read conflicts for the second instruction storage that were not previously contemplated or evaluated. The fetch unit was unaware at the time that the hazard would occur and so evaluated the read conflicts based on the information it had at the time, but such evaluation was potentially insufficient to avoid read conflicts based on the new conditions existing at the second pipeline stage with both the fetch operation 616 and the second fetch operation 622 now residing at that same pipeline stage. One the one hand, there may be no circuitry included to evaluate such read conflicts at the second pipeline stage, since replicating or duplicating such circuitry for multiple pipeline stages may tend to increase power consumption, die area, manufacturing cost, etc. In any event, whereas before there may have been a guarantee that no such read conflicts existed such a guarantee is no longer valid and there could be a read conflict at the read ports of the second instruction storage.

To illustrate the concepts further, consider the following non-limiting detailed example where the fetch unit has N lanes or sets of fetch circuitry. The second instruction storage has less than N read ports. The first instruction storage has at least as many read ports as N minus the number of read ports of the second instruction storage or in some cases N read ports. As a result of retaining the fetch operation 616 and combining or merging the second fetch operation 622 into the same pipeline stage with the retained fetch operation 616, there could now be a greater number of fetch operations in that same pipeline stage (e.g., the second pipeline stage) than the number of read ports available. Attempting to service all the fetch operations from the second instruction storage could therefore result in a read conflict (e.g., a type of problem that wasn't resolved earlier in the pipeline).

Reading the first block of instructions instead from the first instruction storage may help to at least reduce or in some cases completely avoid such read conflicts on the second instruction storage ports. If there are enough read ports at the first instruction storage to satisfy all possible fetch operations (e.g., N read ports at the first instruction storage for N lanes or sets of fetch logic) then such read conflicts can be completely avoided. Using the first instruction storage in this way helps to increase fetch bandwidth, since if your fetch stalls, or if a fetch ahead of your fetch stalls, your fetch is guaranteed to be able to receive data from the first instruction storage to avoid risking a read conflict at the second instruction storage. If this is not the case, using at least some read ports of the first instruction storage in this way may at least help to avoid some such read conflicts.

So, the approach described above (e.g., storing 655, changing 662, reading 658) may tend to offer advantages of avoiding read port conflicts especially when there is a merge of the second fetch operation 622 into the same pipeline stage as the stalled or retained fetch operation 616. However, the usefulness and/or utility of the approach described above (e.g., storing 655, changing 662, reading 658) is not limiting to embodiments where such merging is used, but rather has more general utility. For one thing, it may tend to offer read port bandwidth advantages of being able to perform an L0 fill, whether or not merging is used. For another thing, it may tend to offer power savings advantages in cases where reading from the first instruction storage consumes less power than reading from the second instruction storage.

FIG. 7 is a block flow diagram of a method 770 of fetching instructions, which includes storing a block of instructions from a second instruction storage to a first instruction storage while a fetch operation is retained due to a hazard and reading the block of instructions from the first instruction storage when the fetch operation resumes, according to some embodiments. In various embodiments, the method may be performed by a fetch unit, fetch circuitry, a processor, instruction processing apparatus, digital logic device, or integrated circuit. In some embodiments, the method 770 may be performed by and/or with the processors and/or fetch units of FIG. 1 and/or FIG. 2 and/or FIG. 6. The components, features, and specific optional details described herein for the processors and fetch units of FIG. 1 and/or FIG. 2 and/or FIG. 6 also optionally apply to the method 770. Alternatively, the method 770 may be performed by and/or within a similar or different fetch unit, processor, or apparatus. Moreover, the fetch units and/or processors of FIG. 1 and/or FIG. 2 and/or FIG. 6 may perform methods the same as, similar to, or different than the method 770.

The method includes sharing a first instruction storage among a plurality of sets of fetch circuitry spanning a plurality of pipeline stages, at block 771. In some embodiments, sharing the first instruction storage comprises sharing at least as many read ports of the first instruction storage as a total number of the plurality of sets of fetch circuitry. In some embodiments, the first instruction storage is an L0 instruction cache.

The method includes sharing a second instruction storage among the plurality of sets of fetch circuitry spanning the plurality of pipeline stages, at block 772. In some embodiments, sharing the second instruction storage comprises sharing fewer read ports of the second instruction storage than a total number of the plurality of sets of fetch circuitry. In some embodiments, the first instruction storage is an L1 instruction cache.

The method includes initiating a fetch operation for a block of instructions, with a first set of fetch circuitry of the plurality of sets of fetch circuitry, at block 773. In some embodiments, the fetch operation may specify or otherwise indicate that the block of instructions is to be read from the second instruction storage.

At block 774, the fetch operation may be retained at a pipeline stage of the plurality of pipeline stages of the first set of fetch circuitry, for one or more cycles, until a hazard corresponding to the pipeline stage has been removed. In some embodiments, the method may optionally include advancing a second fetch operation for a second block of instructions into the pipeline stage of a second set of fetch circuitry of the plurality of sets of fetch circuitry from a pipeline stage immediately preceding the pipeline stage of the second set of fetch circuitry, during the one or more cycles. This may cause the prior evaluation of read port conflicts to be no longer valid, as previously described.

At block 775, the block of instructions may be stored from the second instruction storage to the first instruction storage, during the one or more cycles. In some embodiments, blocks of instructions read from the second instruction storage may be stored in the first instruction storage for all fetch operations retained in the pipeline stage for one or more cycles due to hazards associated with the fetch operations. If desired, in some embodiments, all blocks of instructions read from the second instruction storage may be stored in the first instruction storage even when not associated with a hazard.

At block 776, once the hazard has been removed, the block of instructions may be read from the first instruction storage for the fetch operation. Advantageously, in some embodiments, reading the block of instructions from the first instruction storage instead of from the second instruction storage may help at least at times to prevent a read port conflict at the second instruction storage.

The method 770 has been described in a relatively basic form but operations may optionally be added to and/or removed from the method. For example, in some embodiments, the method may also optionally include changing the indication to be an indication that the block of instructions is to be read from the first instruction storage, prior to reading the block of instructions from the first instruction storage for the fetch operation. In addition, while the flow diagrams show a particular order of operations according to embodiments, that order is exemplary. Alternate embodiments may perform the operations in different order, combine certain operations, overlap certain operations, etc. For example, the operations of blocks 771 and 772 may be concurrent and ongoing and may overlap with the operation of block 773.

Figure 8:
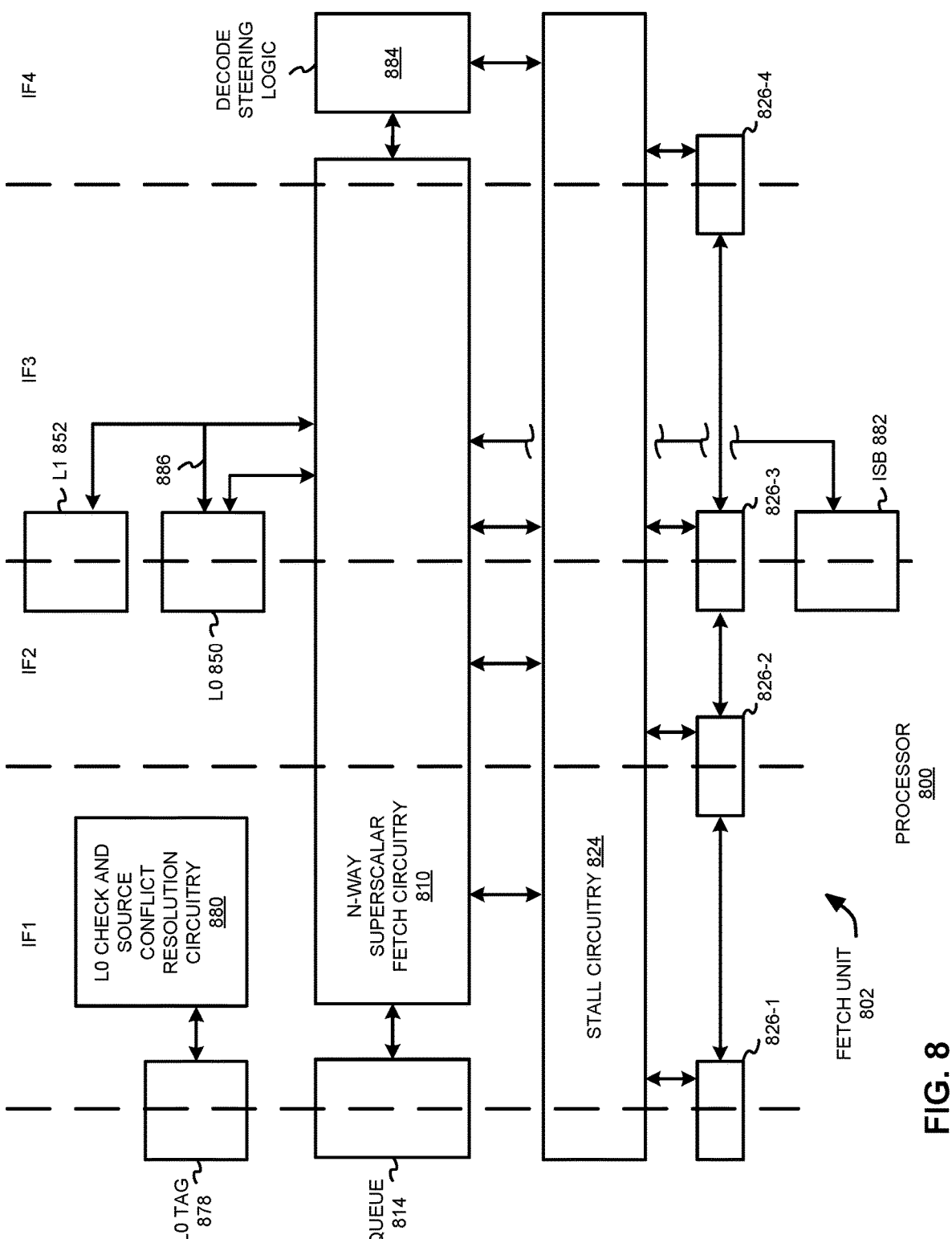
FIG. 8 is a block diagram of a processor having a detailed example embodiment of a fetch unit.

FIG. 8 is a block diagram of a processor 800 having a detailed example embodiment of a fetch unit 802. In some embodiments, the fetch unit may be operative to implement approaches similar to or the same as those shown and described above for FIGS. 2-4 and/or FIGS. 6-7. Details provided for this fetch unit 802 may optionally be applied to the fetch unit of FIG. 1 and/or FIG. 2 and/or FIG. 6. However, the scope of the invention is not limited to this specific fetch unit.

The fetch unit 802 of this example has four pipeline stages, including instruction fetch pipeline stage one (IF1), instruction fetch pipeline stage two (IF2), instruction fetch pipeline stage three (IF3), and instruction fetch pipeline stage four (IF4). Alternate embodiments may have fewer or more pipeline stages. The fetch unit of this example has N-way (e.g., at least two-way, at least three-way, at least four-way, or at least five-way) superscalar fetch circuitry 810 that includes N lanes or other sets of fetch circuitry (e.g., at least two lanes, at least three lanes, at least four lanes, or at least five lanes) spanning or otherwise having all four of these pipeline stages. The N lanes or other sets of fetch circuitry include N-way replicated circuitry distributed throughout the four pipeline stages. Each set of fetch circuitry may be operative, at least at times, to concurrently perform fetch operations to fetch a corresponding cache line or other block of instructions during the same cycle.

The processor also includes an address queue 814 (as an example of an instruction fetch initiation or request circuit), an L0 tag array or structure 878, and L0 instruction cache 850, an L1 instruction cache 852, and an ISB 882. Each of these components is coupled with the fetch unit as shown by the arrows in the illustrations. The address queue is used to queue or otherwise store a list of addresses of blocks of instructions to be fetched (e.g., in program order) by the fetch unit. The address queue may also store hints or other indications of where the blocks of instructions are stored in the implemented instruction storage (e.g., the L0 instruction cache, the L1 instruction cache, and the ISB). Alternate embodiments may use a different type of instruction fetch initiation or request circuit than the address queue, as previously mentioned. The L0 instruction cache, the L1 instruction cache, and the ISB are examples of different types of instruction storage. Alternate embodiments may use fewer, more, and/or different types of instruction storage.

The IF1 stage of the N-way superscalar fetch circuitry 810 may initiate fetch operations. For example, the addresses of the next blocks of instructions to be fetched may be read from the address queue 814. The IF1 stage may also read the hints or other indications of where the blocks of instructions are stored in the implemented instruction storage from the address queue. The IF1 stage may attempt to schedule up to N cache line reads and/or fetch operations onto the fetch unit per cycle (e.g., one for each of the N-way superscalar lanes or sets of fetch circuitry). The cache line reads or fetch operations may be satisfied by a combination of the read ports available on implemented instruction storage (e.g., the L0 instruction cache, the L1 instruction cache, and the ISB). Based on the numbers of read ports, and the hints or indications from the queue of where the blocks are stored, the IF1 stage may determine how many of the N blocks of instructions fetch operations may be initiated to go forward for the cycle.

The IF2 stage of the N-way superscalar fetch circuitry 810 may prepare the read addresses for the different cache lines or other blocks of instructions to allow the actual accesses to be performed. The IF3 stage of the N-way superscalar fetch circuitry may perform the actual accesses to the blocks from their sources. The IF3 stage also selection and routing circuitry (not shown) to select and route data out of the L0 cache, the L1 cache, and the ISB into N-way staging buffers (not shown). Decode steering circuitry 884 of the fetch unit may examine the fetched blocks of instructions in the staging buffers and determine how to provide them to decode circuitry.

Various types of L0 instruction caches are suitable. In one example the L0 instruction cache may be a fully-associative cache. The L0 instruction cache 850 is typically a relatively small cache or is at least smaller than the L1 instruction cache 852. By way of example, the L0 instruction cache may have from about 4 to 20 entries, or from about 8 to 16 entries, although other sizes may also be used. The L0 instruction cache may include an L0 tag structure 878 as well as L0 data structure 850. The L0 data structure may represent an array in which the entries store the blocks and any optional metadata (e.g., parity bits and predecode bits). The L0 tag structure may include an array of entries to store the location of a particular L0 block in the L1 instruction cache. To check whether the block is cached in the L0 instruction cache, the fetch unit may include L0 check and source conflict resolution circuitry 880 which may check the L0 tag array. For example, the L0 tag array or structure may be read and CAMed (content addressable memory checked) against the requested block of instructions scheduled for fetch in IF1.

In the event of a hit in the L0 instruction cache, the IF1 may schedule an L0 read. In the event of a miss in the L0 instruction cache, and a hit in the L1 instruction cache, in some embodiments, an L0 victim block may be chosen (e.g., based on least recent use or other algorithm) so that the block read from the L1 instruction cache may be allocated in and stored in the L0 instruction cache. As described elsewhere herein (e.g., in conjunction with FIGS. 6-7), in some embodiments, an L0 data structure write may be scheduled for every L1 data read, so that a block may be written to the L0 data structure for each L1 data read. The L0 tag may be updated in IF1 with that pending write location within the L1 instruction cache (e.g., the bank and set). In some cases, the L0 tag structure may also be accessed in IF2.

Commonly, the number of read and write ports of the L0 and L1 instruction caches may depend in part upon the number of lanes or other sets of fetch circuitry, the stages in which the ports are accessed, and other factors. In one illustrative example embodiment, the N-way superscalar fetch circuitry may include N lanes or sets of fetch circuitry, the L0 tag array may have N L0 tag read ports and N L0 tag write ports. The L0 tag ports may be shared between servicing fetch operations or fetches at the IF1 and IF2 pipeline stages. Generally, for the N-way superscalar fetch unit, N read ports on the L0 tag array are sufficient to satisfy the IF1 and IF2 L0 tag read requests. In other embodiments, fewer or more L0 tag read ports and/or fewer or more L0 tag write ports may be used. Adding ports to L0 tends to be inexpensive given its relatively narrow entry width. In one example embodiment, for the N lanes or sets of fetch circuitry in this example, the L0 data structure may have N read ports and less than N (e.g., N/2) write ports. The L0 data structure may be read in IF3 in parallel with the L1 data structure read and the ISB read. The L0 data structure write may occur in IF4 after an L1 data structure read.

In some cases, the L1 instruction cache 852 may have fewer read ports that can be used to read blocks of instructions on the same cycle than the number of concurrent fetches that can be performed by the lanes or sets of fetch circuitry on the same cycle. In such cases, there may be times when you want to read a greater number of blocks than can be read solely from the L1 cache due to its limited number of read ports. For example, the L1 cache may have less than N physical read ports but N concurrent fetches may be possible. In such a case, if it is desired to read a greater number of blocks of instructions on that cycle, then only two (or at least less than all) of the blocks of instructions desired to be read on that cycle can actually be read on that cycle due to the limited number of read ports of the L1 cache. To help reduce pressure on the limited number of read ports of the L1 cache, in some embodiments, the IF1 stage may check the L0 tag array to determine whether the blocks of instructions can be obtained from the L0 instruction cache, irrespective of the hints or other indications of the sources of the blocks of instructions from the address queue 814. In some embodiments, the L0 instruction cache may have more read ports than the L1 cache. So, any blocks of instructions that can be sourced from the L0 instruction cache commonly will be sourced from the L0 instruction cache. For those that remain, the IF1 stage may determine from the hints or other indications of the sources of the blocks, which can be obtained from the other sources subject to their restrictions. For example, the IF1 may determine which of the remaining blocks can be obtained from the L1 instruction cache (subject to the limited number of read ports) and which can be obtained from the ISB. The sum of all these is the total number of blocks of instructions that can be fetched.

As mentioned above (e.g., in conjunction with FIGS. 6-7), in some embodiments, when blocks are read out from L1 instruction cache, they may be cached or stored in L0 instruction cache. That is an L0 data structure write may be scheduled for every L1 data read so that a block may be written to the L0 data structure for each L1 data read. In some embodiments, once it has been decided in the IF1 stage that the source of a block for a fetch is the L1 cache, even if there is a conflict or hazard in any pipestage, the block may still be read from the L1 cache during the IF3 stage, and the block read from the L1 cache may be cached or stored in the L0 cache. Regardless of whether any stalls happen in IF3, IF2, or IF1, as the stall is backpropagated, once the L1 cache read has been initiated at IF1, that read of the L1 cache will occur and the block read from the L1 cache will be stored into the L0 cache regardless of even when there is a hazard. As shown, in some embodiments, there may be a dedicated interconnect, wiring, connection, or other coupling 886 outside of the typical pipeline stages to store such cache lines even when there is a stall for the pipeline stage. This may be beneficial especially when the L1 instruction cache has fewer read ports than the number of N-way superscalar lanes or sets of fetch circuitry capable of performing concurrent fetches. For example, there may be less than N (e.g., less than three) read ports on the L1 instruction cache but there may be N (e.g., at least three) superscalar lanes or sets of fetch circuitry. When that is the case, there may be times when there are not enough read ports on the L1 instruction cache to satisfy all the read requests. At least in those cases, fetch throughput could be improved by being able to utilize one or more L0 instruction cache read ports. For example, this offers and advantage of subsequently being able to read the block from the L0 cache instead of from the L1 cache. This may help to free up the read port of the L1 cache that would otherwise have been needed to read the block from the L1 cache. This offers a given fetch a guarantee that if that given fetch encounters a hazard, or a fetch ahead of that given fetch encounters a hazard, the given fetch is guaranteed that it is always going to have a source for its block. This means that the fetch pipeline can replace any lookups that previously needed to go to the L1 cache with lookups in the L0 cache. In some cases, the L0 cache may have enough read ports that it will not have any read port conflict issues on a cycle, or in other cases it may have at least less or less frequent read conflict issues than the L1 cache. Accordingly, reading the block from the L1 cache and storing it into the L0 cache even when there is a hazard helps to support, benefits, and has symbiosis with, the stall and merge approach described elsewhere herein. An alternate approach would be to simply not read from the L1 cache during the IF3 stage when there is a conflict or hazard, but such an alternate approach foregoes at least some of the advantages just mentioned (e.g., when a fetch occupies a read port of the L1 cache and gets stalled it can create unresolved port conflicts at the L1 cache).

Referring again to the illustration, the fetch unit also has an embodiment of stall circuitry 824. The stall circuitry generally spans or otherwise has all pipeline stages IF1-IF4. The stall circuitry may be operative to selectively stall a given pipeline stage (and preceding pipeline stages) of a given lane or set of fetch circuitry implicated by a hazard, while selectively not stalling or advancing other lanes, as described elsewhere herein (e.g., in conjunction with FIGS. 2-3). To avoid obscuring the description, the various ways in which this may be done as mentioned in FIGS. 2-3 will not be repeated. The fetch unit may also include a different age indication circuitry 826-1, 826-2, 826-3, and 826-4, each at a different pipeline stage, to indicate age related information for fetch operations at that pipeline stage, as described elsewhere herein.

Figure 9:
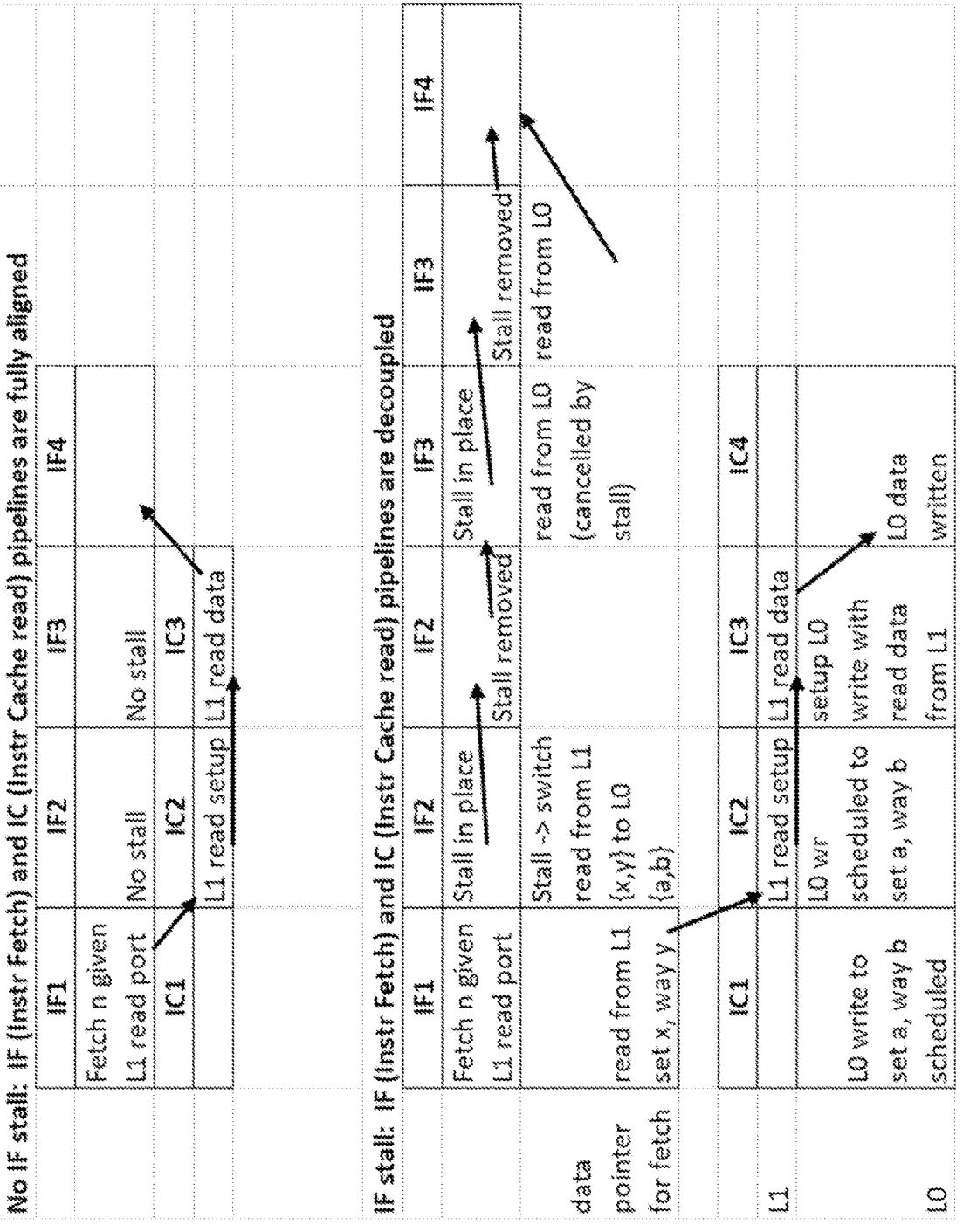
FIG. 9 is a diagram illustrating further details of storing blocks of instructions from an L1 cache to an L0 cache with decoupled instruction fetch and instruction cache pipelines with and without instruction fetch stall due to hazards, according to one embodiment.

FIG. 9 is a diagram illustrating further details of storing blocks of instructions from an L1 cache to an L0 cache with decoupled instruction fetch and instruction cache pipelines with and without instruction fetch stall due to hazards, according to one embodiments. The fetch pipeline has four stages (IF1, IF2, IF3, IF4) in this example. The instruction cache pipeline also has four stages (IC1, IC2, IC3, IC4) in this example. The top portion of the illustration is for when there is no instruction fetch stall. The bottom portion of the illustration is for when there is an instruction fetch stall. The L1 read pipeline being decoupled from the hazards causing stalls helps to prevent a read port oversubscription problem when stalled fetches are merged with younger fetches. The L0 and L1 instruction caches referenced are examples of first and second instruction storage.

In some embodiments, to stall or retain a fetch operation, the stall circuitry 824 may include circuitry to, when a fetch operation stalls in a certain nth fetch pipeline stage, IF(n), gate the clock writing into its corresponding flop, such that it can reuse the data after the stall is removed. The stall circuitry may also propagate or send the stall signal back down its own lane to the corresponding fetch operations of the previous pipeline stages (e.g., IF(n−1), IF(n−2), through IF(n−1)). The stall may continue to propagate backward while the corresponding fetch operation is valid and may drop at the first non-valid fetch operation. Once the stall reaches IF1, it may be treated as a regular fetch kill, which may be recycled in the next cycle with without needing to insert no-operations or other bubbles. The stall circuitry may perform different operations to stall distinct stages of the pipeline. For example, to stall a fetch operation in IF2 for the illustrated example fetch unit may involve stalling on preparing the read addresses for the different blocks of instructions and the read enables to the instruction caches. As another example, to stall in IF3, this may include stalling the IF1, IF2, and IF3 flops which mainly contain "control" pointers, but the block may still be read from the L1 instruction cache, and stored into the L0 instruction cache, but may not be stored in the staging buffer. So, as in this later case, to stall does not necessarily imply that no operations are performed for the stage, although often at least one operation associated with advancing the fetch operation/data to the next stage may not be performed. Lanes not stalled may be advanced by selectively not performing such operations to stall or retain fetches.

Now, in some situations, it may not be possible to advance a fetch operation for an entire block of instructions from a given pipeline stage, since a hazard condition may exist that would prevent it (e.g., a subsequent stage, unit, or circuit may not be able to accept or process the entire block of instructions). Nevertheless, in some embodiments, it may be possible to advance a fetch operation for a portion or part of the entire block of instructions from the given pipeline stage (e.g., the subsequent stage, unit, or circuit may be able to accept and/or process the portion or the part of the entire block of instructions). For example, a fetch operation for an entire cache line of instructions may not be able to advance from the given pipeline stage due to a hazard, but it may be possible to advance a fetch operation for a portion of the entire cache line of instructions (e.g., one quarter, one half, three quarters, or some other fraction of the cache line of instructions). As one example, this may be the case when the superscalar lanes of fetch circuitry provide more instructions than a subsequent stage or unit (e.g., cluster-steering-logic) is able to handle in one cycle. The subsequent stage or unit may not be able to accept and process an entire cache line of instructions, but the subsequent stage or unit may be able to accept and process some portion of the entire cache line of instructions.

In some embodiments, a fetch operation for a cache line or other block of instructions may be split or divided into two or more fetch operations. Each of the two or more fetch operations may fetch only a fraction or other portion of the original cache line or other block of instructions. As one specific illustrative example, a first fetch operation for a 512-bit cache line of instructions may be split into a second fetch operation for a 256-bit first half of the cache line of instructions and a third fetch operation for a 256-bit second half of the cache line of instructions. A first of the two fetch operations may be allowed to advance to the next or sequential stage, unit, or circuit (e.g., the can-be-consumed instructions may progress along the pipeline). A second of the two fetch operations may not be allowed to advance in that same cycle, but rather may be handled differently. That is, instead of operating at full cache line or other block of instruction granularity as previously described for stall and merge, analogous ideas may be applied at smaller granularities of only part of the cache lines or other blocks of instructions. Several different ways of handling the second fetch operation are contemplated and are discussed next.

In some embodiments, a so-called resteer approach is used to handle the second fetch operation. In this resteer approach, the second fetch operation for the portion of the block of instructions may be resteered or sent backward in the fetch pipeline, such as, for example, returned to the queue or other instruction fetch initiation or request circuit (e.g., 214 and/or 614). For example, one entry in the queue may be split into multiple instruction fetch packets traveling down the pipeline. In order to differentiate between the different split packets representing the same queue entry, each packet traveling down the pipeline may have two additional fields, namely a start_consume_chunk field (e.g., a 2-bit field) which is used to indicate the first chunk (e.g., 16-byte-aligned) to consume in this packet, and an end_consume_chunk (e.g., a 2-bit field) which is used to indicate the last chunk (e.g., 16-byte-aligned) to consume in this packet. The start/end_consume_chunks may represent a range of available consumption chunks that is a subset of the range provided by their parent queue entry's cacheline entry point (BrIn) and the cacheline exit point (BrOut computed from a branch exit point or otherwise "11").

While the cacheline's entry point (BrIn) and exit points (BrOut) may be stored in the queue entry and defined by branch prediction, start_consume_chunk and end_consume_chunk may not be stored in the queue but may instead be computed by the queue read logic on a split-and-resteer and may be maintained by the fetch pipeline packet. In particular, on the resteer, a resteer signal may be sent accompanied with the first chunk that could not be advanced and that is instead resteered. This is referred to as chunk(x). The resteered fetch will split into two fetches, an original fetch that will move forward down the pipeline with its start_consume_chunk unchanged and its end_consume_chunk set to chunk(x)−1. The other split will resteer to the queue or other instruction fetch initiation or request circuit (e.g., 214 and/or 614) with the HVQ read logic ready to update or change its start/end_consume_chunk fields. The start_consume_chunk may be changed to chunk(x) and the end_consume_chunk may be changed to be same as BrOut chunk. In some embodiments, the deallocation of a queue entry may be deferred or delayed until its instruction fetch packet has made it to the final instruction fetch pipeline stage (e.g., IF4) and/or meets the condition that end_consume_chunk=BrOut Chunk.

In some embodiments, as described elsewhere herein for full blocks of instructions, if the parent fetch operation missed in a first instruction storage (e.g., L0) and initiated a read in a second instruction storage (e.g., an L1 read), then the child split fetch operations may automatically read from the first instruction storage (e.g., L0) without reissuing the read from the second instruction storage (e.g., without reissuing an L1 read). The parent fetch may miss in the first instruction storage (e.g., L0) in an early pipeline stage, and then initiate the read from the second instruction storage (e.g., L1). Then, when the split fetch operation gets reissued from the queue or other instruction fetch initiation or request circuitry (e.g., 214 and/or 614), it will now hit in the first instruction storage (e.g., L0). This is a result of the read from the second instruction storage (e.g., L1) writing into the first instruction storage (e.g., L0).

As another option, instead of the resteer approach, in some embodiments, the second fetch operation may be handled by a stall or retain approach similar to those discussed elsewhere herein. The original or parent fetch operation may be split into two fetch operations. One of the two fetch operations may move forward down the pipeline while the other fetch operation may be stalled or retained in place for one or more cycles until the hazard has been removed, similarly as previously described.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figures 11A, 11B:
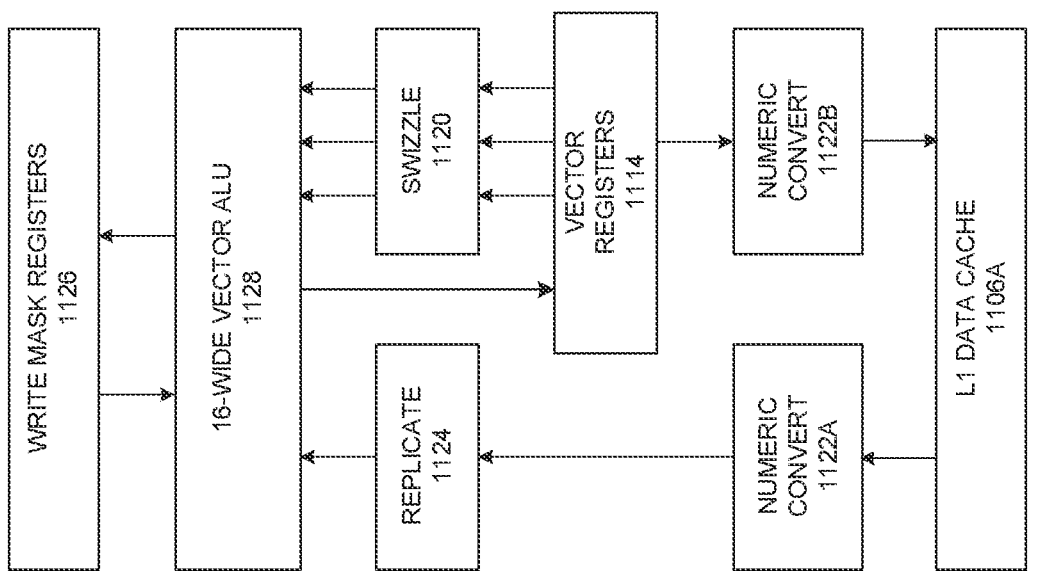
FIG. 11A is a block diagram of an embodiment of a single processor core, along with its connection to the on-die interconnect network, and with its local subset of the Level 2 (L2) cache.
FIG. 11B is a block diagram of an embodiment of an expanded view of part of the processor core of FIG. 11A.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
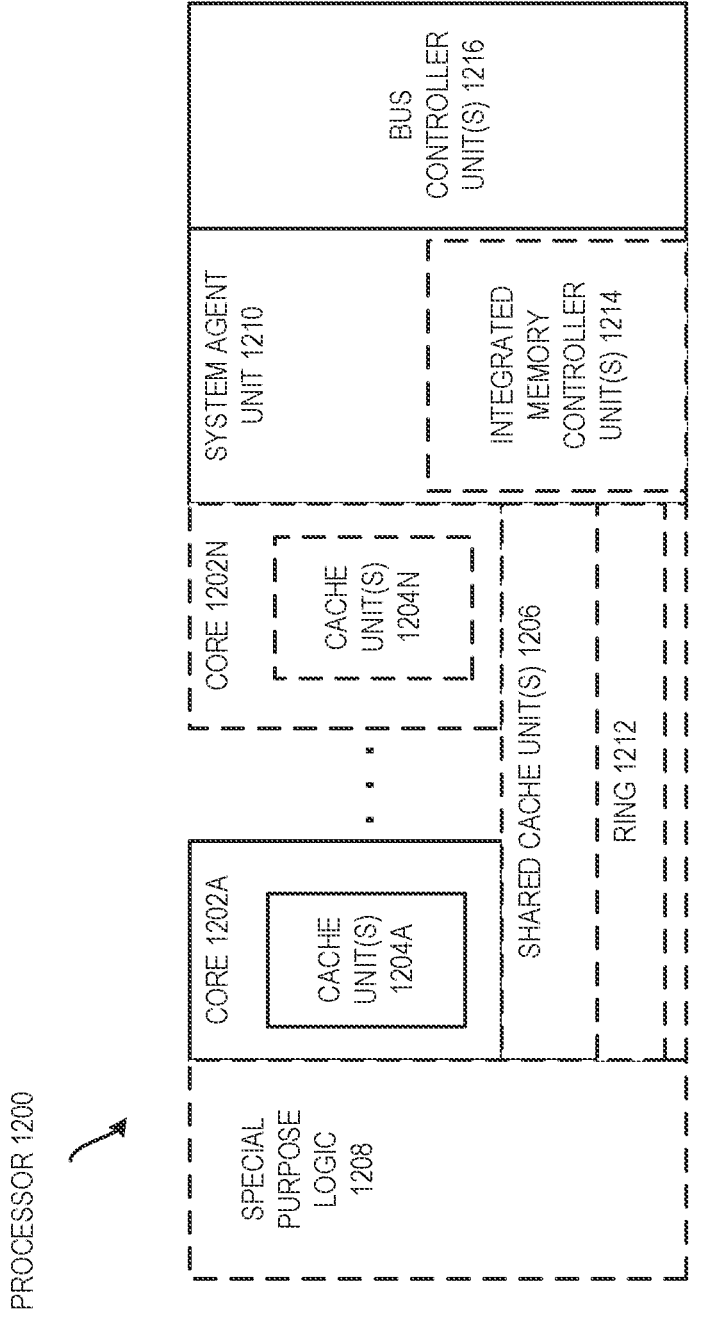
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
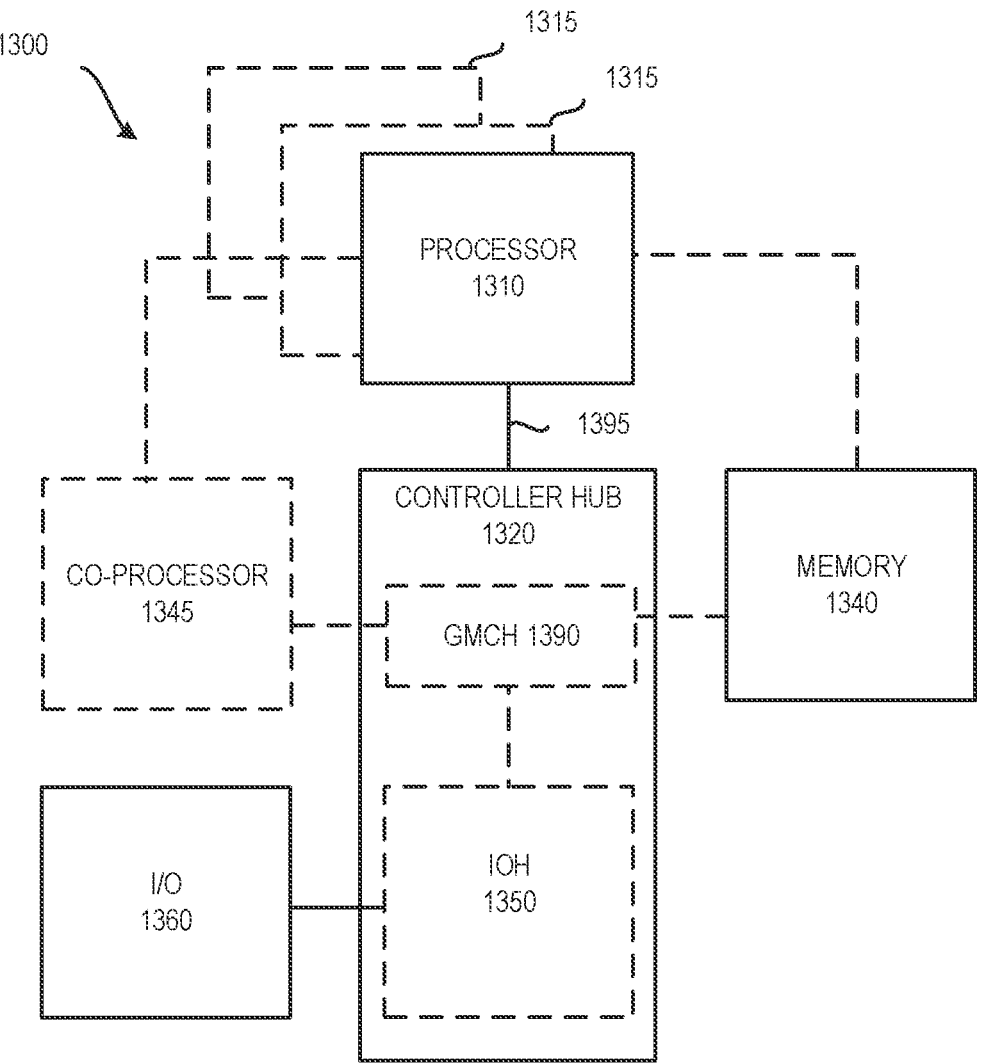
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
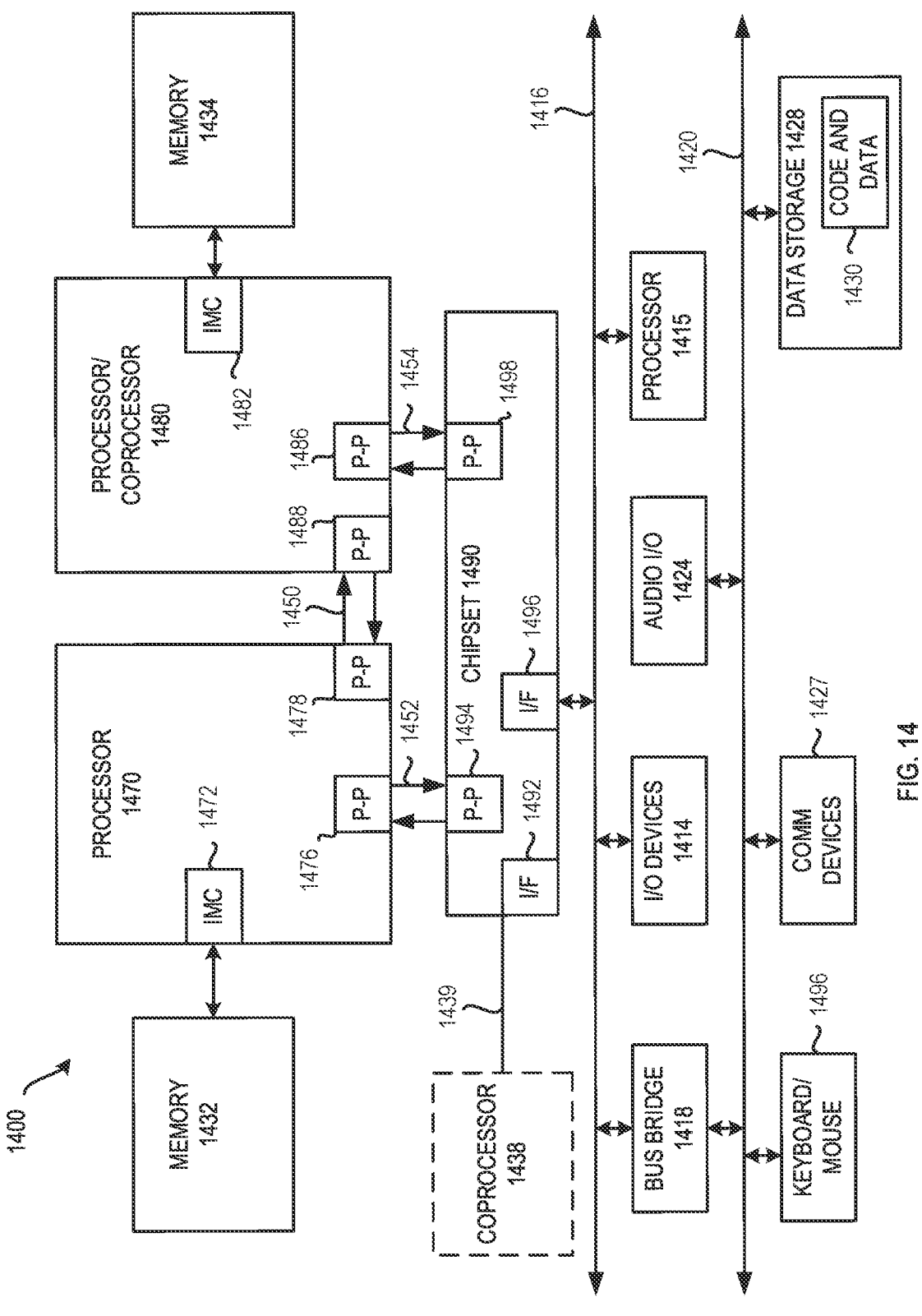
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
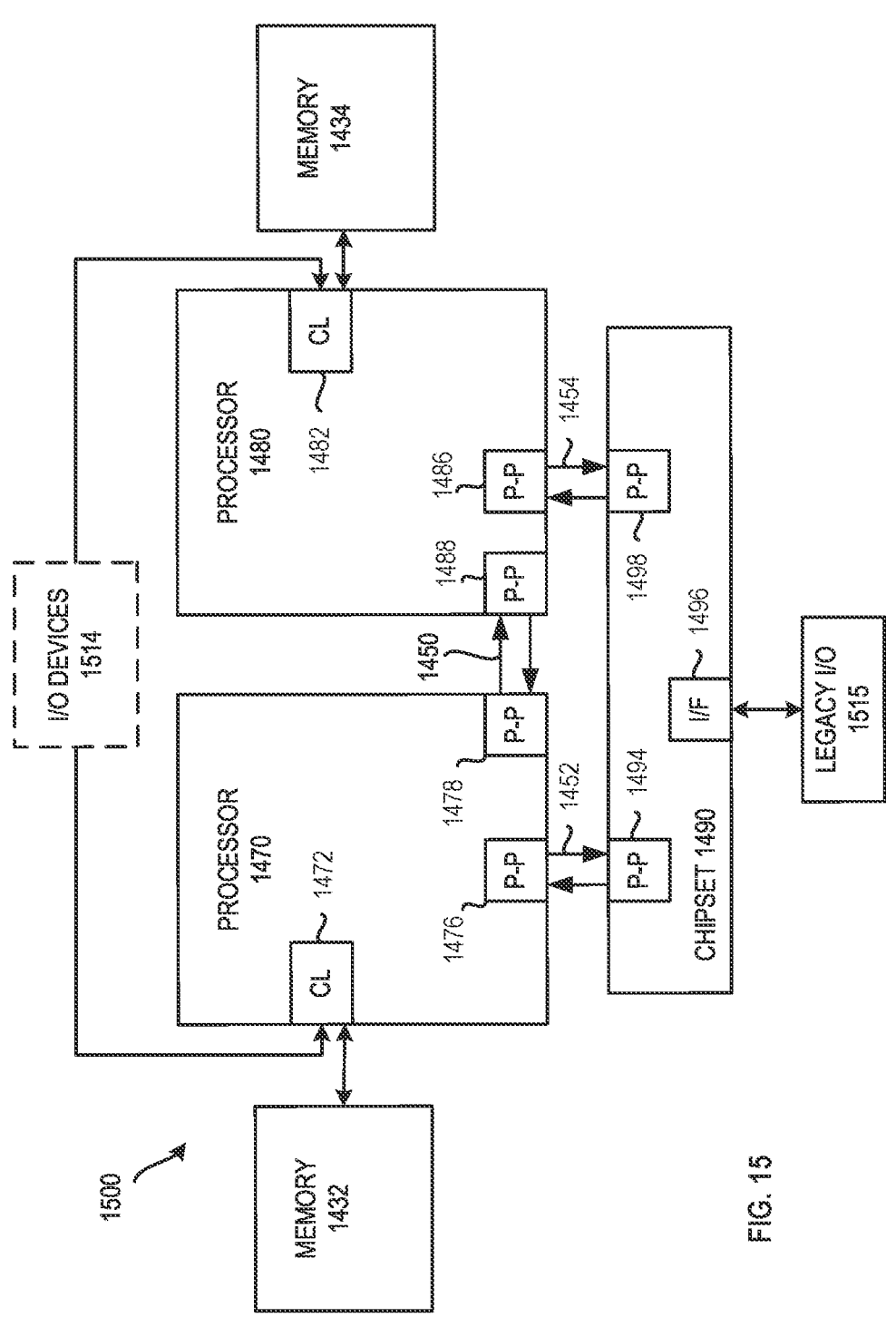
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
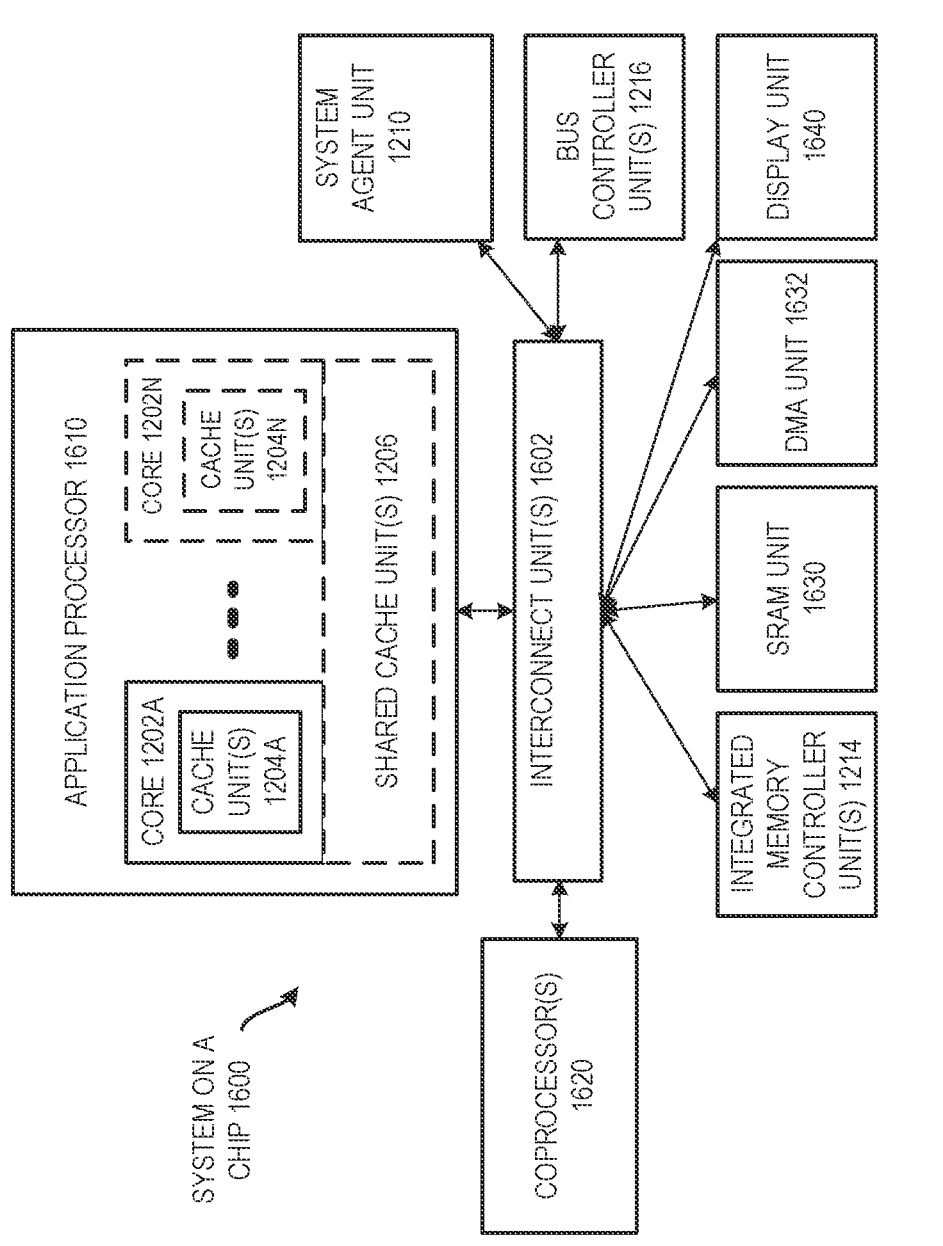
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
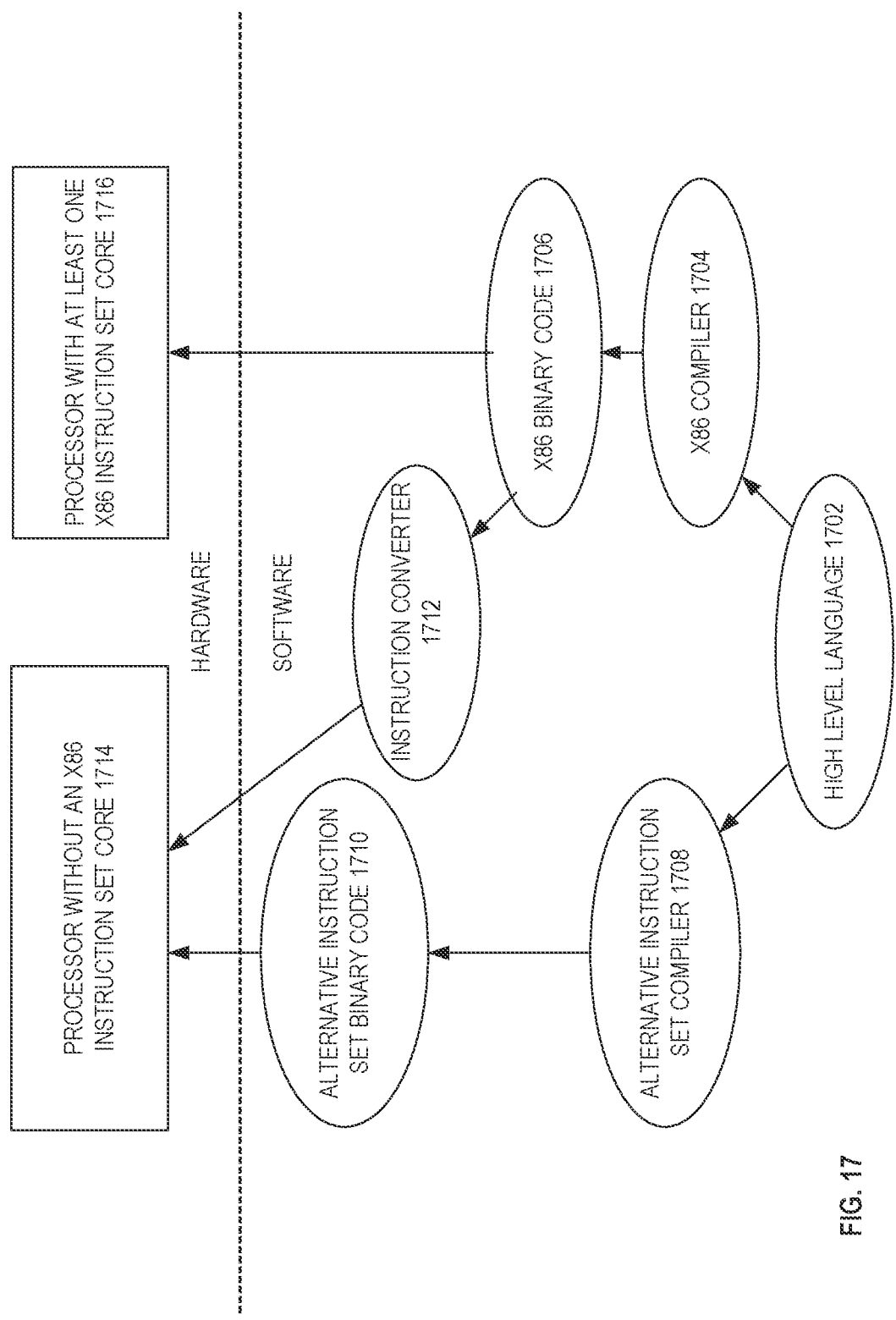
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 8-9 may also optionally apply to any of FIGS. 2-3 and/or FIGS. 6-7. Components, features, and details described for any of the processors disclosed herein (e.g., 200, 600, 800) may optionally apply to any of the methods disclosed herein (e.g., 330, 770), which in embodiments may optionally be performed by and/or with such processors. Any of the processors described herein (e.g., 200, 600, 800) in embodiments may optionally be included in any of the computer systems or other systems disclosed herein.

Processor components disclosed herein may be said and/or claimed to be operative, operable, capable, able, configured adapted, or otherwise to perform an operation. For example, a fetch unit may be said and/or claimed to be operative to and/or to fetch a block of instruction, or the like. As used herein, these expressions refer to the characteristics, properties, or attributes of the components when in a powered-off state, and do not imply that the components or the device or apparatus in which they are included is currently powered on or operating. For clarity, it is to be understood that the processors and apparatus claimed herein are not claimed as being powered on or running.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, a cache or other type of instruction storage may be coupled with a fetch unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes at least one instruction storage, and a fetch unit coupled with the at least one instruction storage. The fetch unit including a plurality of sets of fetch circuitry, including a first set of fetch circuitry and a second set of fetch circuitry. Each of the sets of fetch circuitry has a same plurality of pipeline stages. The sets of fetch circuitry to perform fetch operations to fetch blocks of instructions from the at least one instruction storage. Stall circuitry, in response to an indication of a hazard for a given pipeline stage of the plurality of pipeline stages of the first set of fetch circuitry, to retain a fetch operation for a first block of instructions at the given pipeline stage of the first set of fetch circuitry, and zero or more fetch operations for zero or more corresponding blocks of instructions at zero or more preceding pipeline stages of the first set of fetch circuitry, for one or more cycles, until the hazard has been removed. The stall circuitry is also to advance a fetch operation for a second block of instructions from the given pipeline stage of the second set of fetch circuitry, during an initial cycle of the one or more cycles.

Example 2 includes the apparatus of Example 1, in which the stall circuitry is advance a fetch operation for a third block of instructions from an immediately preceding pipeline stage of the second set of fetch circuitry into the given pipeline stage of the second set of fetch circuitry, optionally during the initial cycle of the one or more cycles.

Example 3 includes the apparatus of any one of Examples 1 to 2, further including circuitry to indicate that a fetch operation for a block of instructions at the given pipeline stage is older in program order than all other fetch operations at the given pipeline stage, optionally after the fetch operation for the third block of instructions has advanced into the given pipeline stage.

Example 4 includes the apparatus of any one of Examples 1 to 3, optionally in which the fetch operation for the first block of instructions is to indicate that the first block of instructions is to be obtained from a second instruction storage of the at least one instruction storage, and optionally in which the stall circuitry is further to store the first block of instructions from the second instruction storage to a first instruction storage of the at least one instruction storage during the one or more cycles.

Example 5 includes the apparatus of any one of Examples 1 to 4, in which the plurality of sets of fetch circuitry includes at least three sets of fetch circuitry.

Example 6 includes the apparatus of any one of Examples 1 to 5, in which the plurality of pipeline stages includes at least three pipeline stages.

Example 7 includes the apparatus of any one of Examples 1 to 6, optionally in which the first block of instructions is a first cache line of instructions, and optionally the second block of instructions is a second cache line of instructions.

Example 8 includes the apparatus of Example 7, in which the first and second cache lines of instructions are 512-bit cache lines of instructions.

Example 9 includes the apparatus of any one of Examples 1 to 8, in which the plurality of sets of fetch circuitry includes at least three sets of fetch circuitry, in which the plurality of pipeline stages includes at least three pipeline stages, and in which the first block of instructions is a first cache line of instructions.

Example 10 is a method performed by a processor or other apparatus that includes storing instructions in at least one instruction storage. The method also includes concurrently initiating a fetch operation for a first block of instructions from the at least one instruction storage with a first set of fetch circuitry, and initiating a fetch operation for a second block of instructions from the at least one instruction storage with a second set of fetch circuitry. The first and second sets of fetch circuitry each having a same plurality of pipeline stages. The method also includes receiving an indication of a hazard for a given pipeline stage of the plurality of pipeline stages of the first set of fetch circuitry. The method also includes retaining the fetch operation for the first block of instructions at the given pipeline stage of the first set of fetch circuitry, and retaining zero or more fetch operations for zero or more corresponding blocks of instructions at zero or more preceding pipeline stages of the first set of fetch circuitry, for one or more cycles, until the hazard has been removed. The method also includes advancing the fetch operation for the second block of instructions from the given pipeline stage of the second set of fetch circuitry, during an initial cycle of the one or more cycles.

Example 11 includes the method of Example 10, further including advancing a fetch operation for a third block of instructions from an immediately preceding pipeline stage of the second set of fetch circuitry into the given pipeline stage of the second set of fetch circuitry, during the initial cycle of the one or more cycles.

Example 12 includes the method of any one of Examples 10 to 11, further including indicating that a fetch operation for a block of instructions at the given pipeline stage is older in program order than all other fetch operations at the given pipeline stage, optionally after said advancing the fetch operation for the third block of instructions into the given pipeline stage.

Example 13 includes the method of any one of Examples 10 to 12, optionally in which the fetch operation for the first block of instructions is to indicate that the first block of instructions is to be obtained from a second instruction storage of the at least one instruction storage, and optionally further including storing the first block of instructions from the second instruction storage to a first instruction storage of the at least one instruction storage during the one or more cycles.

Example 14 includes the method of any one of Examples 10 to 13, further including reading the first block of instructions from the first instruction storage for the fetch operation for the first block of instructions.

Example 15 includes the method of any one of Examples 10 to 14, further including initiating a fetch operation for a third block of instructions from the at least one instruction storage with a third set of fetch circuitry.

Example 16 includes the method of any one of Examples 10 to 15, in which initiating the fetch operation for the first block of instructions includes initiating the fetch operation for a first cache line of instructions.

Example 17 includes the method of any one of Examples 10 to 16, in which initiating the fetch operation for the first block of instructions includes initiating the fetch operation for a first 512-bit cache line of instructions.

Example 18 is a computer system that includes a dynamic random access memory (DRAM), and a processor coupled with the DRAM. The processor includes at least one instruction storage, and a fetch unit coupled with the at least one instruction storage. The fetch unit includes a plurality of sets of fetch circuitry, including a first set of fetch circuitry and a second set of fetch circuitry. Each of the sets of fetch circuitry having a same plurality of pipeline stages. The sets of fetch circuitry to perform fetch operations to fetch blocks of instructions from the at least one instruction storage. The processor also includes stall circuitry, in response to an indication of a hazard for a given pipeline stage of the plurality of pipeline stages of the first set of fetch circuitry, to retain a fetch operation for a first block of instructions at the given pipeline stage of the first set of fetch circuitry, and zero or more fetch operations for zero or more corresponding blocks of instructions at zero or more preceding pipeline stages of the first set of fetch circuitry, for one or more cycles, until the hazard has been removed. The stall circuitry to advance a fetch operation for a second block of instructions from the given pipeline stage of the second set of fetch circuitry, during an initial cycle of the one or more cycles.

Example 19 includes the computer system of Example 18, in which the stall circuitry is advance a fetch operation for a third block of instructions from an immediately preceding pipeline stage of the second set of fetch circuitry into the given pipeline stage of the second set of fetch circuitry, optionally during the initial cycle of the one or more cycles.

Example 20 includes the computer system of any one of Examples 18 to 19, in which the processor further includes circuitry to indicate that a fetch operation for a block of instructions at the given pipeline stage is older in program order than all other fetch operations at the given pipeline stage, optionally after the fetch operation for the third block of instructions has advanced into the given pipeline stage.

Example 21 includes the computer system of any one of Examples 18 to 20, in which the plurality of sets of fetch circuitry includes at least three sets of fetch circuitry.

Example 22 includes the computer system of any one of Examples 18 to 21, in which the plurality of pipeline stages includes at least three pipeline stages.

Example 23 includes the computer system of any one of Examples 18 to 22, in which the first block of instructions is a first cache line of instructions, and the second block of instructions is a second cache line of instructions.

Example 24 is a processor or other apparatus operative to perform the method of any one of Examples 10 to 17.

Example 25 is a processor or other apparatus that includes means for performing the method of any one of Examples 10 to 17.

Example 26 is a processor or other apparatus that includes any combination of modules and/or units and/or logic and/or circuitry and/or means operative to perform the method of any one of Examples 10 to 17.

Example 27 is a processor or other apparatus including means for storing instructions in at least one instruction storage. The apparatus also includes means for concurrently initiating a fetch operation for a first block of instructions from the at least one instruction storage with a first set of fetch circuitry, and means for initiating a fetch operation for a second block of instructions from the at least one instruction storage with a second set of fetch circuitry. The first and second sets of fetch circuitry each having a same plurality of pipeline stages. The apparatus also includes means for receiving an indication of a hazard for a given pipeline stage of the plurality of pipeline stages of the first set of fetch circuitry. The apparatus also includes means for retaining the fetch operation for the first block of instructions at the given pipeline stage of the first set of fetch circuitry, and retaining zero or more fetch operations for zero or more corresponding blocks of instructions at zero or more preceding pipeline stages of the first set of fetch circuitry, for one or more cycles, until the hazard has been removed. The apparatus also includes means for advancing the fetch operation for the second block of instructions from the given pipeline stage of the second set of fetch circuitry, during an initial cycle of the one or more cycles.

What is claimed is:
1. An apparatus comprising:
    at least one instruction storage; and
    a fetch unit coupled with the at least one instruction storage, the fetch unit including:
        a plurality of sets of fetch circuitry, including a first set of fetch circuitry and a second set of fetch circuitry, each of the sets of fetch circuitry having a same plurality of pipeline stages, the sets of fetch circuitry to perform fetch operations to fetch blocks of instructions from the at least one instruction storage; and
        stall circuitry, in response to an indication of a hazard for a given pipeline stage of the plurality of pipeline stages of the first set of fetch circuitry, to:
            retain a fetch operation for a first block of instructions at the given pipeline stage of the first set of fetch circuitry, and zero or more fetch operations for zero or more corresponding blocks of instructions at zero or more preceding pipeline stages of the first set of fetch circuitry, for one or more cycles, until the hazard has been removed;
            advance a fetch operation for a second block of instructions from the given pipeline stage of the second set of fetch circuitry, during an initial cycle of the one or more cycles; and advance a fetch operation for a third block of instructions from an immediately preceding pipeline stage of the second set of fetch circuitry into the given pipeline stage of the second set of fetch circuitry, during the initial cycle of the one or more cycles;

circuitry to indicate that a fetch operation for a block of instructions at the given pipeline stage is older in program order than all other fetch operations at the given pipeline stage, after the fetch operation for the third block of instructions has advanced into the given pipeline stage.

2. An apparatus comprising:

at least one instruction storage; and a fetch unit coupled with the at least one instruction storage, the fetch unit including:

a plurality of sets of fetch circuitry, including a first set of fetch circuitry and a second set of fetch circuitry, each of the sets of fetch circuitry having a same plurality of pipeline stages, the sets of fetch circuitry to perform fetch operations to fetch blocks of instructions from the at least one instruction storage; and stall circuitry, in response to an indication of a hazard for a given pipeline stage of the plurality of pipeline stages of the first set of fetch circuitry, to:

retain a fetch operation for a first block of instructions at the given pipeline stage of the first set of fetch circuitry, and zero or more fetch operations for zero or more corresponding blocks of instructions at zero or more preceding pipeline stages of the first set of fetch circuitry, for one or more cycles, until the hazard has been removed; and advance a fetch operation for a second block of instructions from the given pipeline stage of the second set of fetch circuitry, during an initial cycle of the one or more cycles, wherein the fetch operation for the first block of instructions is to indicate that the first block of instructions is to be obtained from a second instruction storage of the at least one instruction storage, and wherein the stall circuitry is further to store the first block of instructions from the second instruction storage to a first instruction storage of the at least one instruction storage during the one or more cycles.

3. The apparatus of claim 1, wherein the plurality of sets of fetch circuitry comprises at least three sets of fetch circuitry.

4. The apparatus of claim 1, wherein the plurality of pipeline stages comprises at least three pipeline stages.

5. The apparatus of claim 1, wherein the first block of instructions is a first cache line of instructions, and the second block of instructions is a second cache line of instructions.

6. The apparatus of claim 5, wherein the first and second cache lines of instructions are 512-bit cache lines of instructions.

7. The apparatus of claim 2, wherein the plurality of sets of fetch circuitry comprises at least three sets of fetch circuitry, wherein the plurality of pipeline stages comprises at least three pipeline stages, and wherein the first block of instructions is a first cache line of instructions.

8. A method comprising:

storing instructions in at least one instruction storage;

concurrently initiating a fetch operation for a first block of instructions from the at least one instruction storage with a first set of fetch circuitry, and initiating a fetch operation for a second block of instructions from the at least one instruction storage with a second set of fetch circuitry, the first and second sets of fetch circuitry each having a same plurality of pipeline stages;

receiving an indication of a hazard for a given pipeline stage of the plurality of pipeline stages of the first set of fetch circuitry;

retaining the fetch operation for the first block of instructions at the given pipeline stage of the first set of fetch circuitry, and retaining zero or more fetch operations for zero or more corresponding blocks of instructions at zero or more preceding pipeline stages of the first set of fetch circuitry, for one or more cycles, until the hazard has been removed;

advancing the fetch operation for the second block of instructions from the given pipeline stage of the second set of fetch circuitry, during an initial cycle of the one or more cycles;

advancing a fetch operation for a third block of instructions from an immediately preceding pipeline stage of the second set of fetch circuitry into the given pipeline stage of the second set of fetch circuitry, during the initial cycle of the one or more cycles; and indicating that a fetch operation for a block of instructions at the given pipeline stage is older in program order than all other fetch operations at the given pipeline stage, after said advancing the fetch operation for the third block of instructions into the given pipeline stage.

9. The method of claim 8, wherein the fetch operation for the first block of instructions is to indicate that the first block of instructions is to be obtained from a second instruction storage of the at least one instruction storage, and further comprising storing the first block of instructions from the second instruction storage to a first instruction storage of the at least one instruction storage during the one or more cycles.

10. The method of claim 9, further comprising reading the first block of instructions from the first instruction storage for the fetch operation for the first block of instructions.

11. The method of claim 8, further comprising initiating a fetch operation for the third block of instructions from the at least one instruction storage with a third set of fetch circuitry.

12. The method of claim 8, wherein initiating the fetch operation for the first block of instructions comprises initiating the fetch operation for a first cache line of instructions.

13. The method of claim 8, wherein initiating the fetch operation for the first block of instructions comprises initiating the fetch operation for a first 512-bit cache line of instructions.

* * * * *